US008979152B2

(12) United States Patent  
Ciocarlie et al.

(10) Patent No.: US 8,979,152 B2
(45) Date of Patent: Mar. 17, 2015

(54) KINETIC AND DIMENSIONAL OPTIMIZATION FOR A TENDON-DRIVEN GRIPPER

(71) Applicant: Willow Garage, Inc., Menlo Park, CA (US)

(72) Inventors: Matei Ciocarlie, Menlo Park, CA (US); Scott Stanford, Mountain View, CA (US)

(73) Assignee: Willow Garage, Inc., Menlo Park, CA (US)

( * ) Notice: Subject to any disclaimer, the term of this patent is extended or adjusted under 35 U.S.C. 154(b) by 0 days.

(21) Appl. No.: 14/456,450

(22) Filed: Aug. 11, 2014

(65) Prior Publication Data

US 2014/0346796 A1 Nov. 27, 2014

Related U.S. Application Data

(63) Continuation of application No. 14/050,075, filed on Oct. 9, 2013, now Pat. No. 8,833,827.

(60) Provisional application No. 61/711,729, filed on Oct. 9, 2012.

(51) Int. Cl.
 *B25J 15/00* (2006.01)
 *B66C 1/00* (2006.01)
 *B25J 15/08* (2006.01)

(52) U.S. Cl.
 CPC ............... *B25J 15/08* (2013.01); *Y10S 901/38* (2013.01); *Y10S 901/21* (2013.01); *Y10S 901/31* (2013.01)
 USPC ............... 294/111; 294/106; 901/21; 901/31; 901/38

(58) Field of Classification Search
 USPC ......... 294/106, 111; 623/21.15–21.17, 21.19; 414/2–5, 7; 901/21, 30, 31
 See application file for complete search history.

(56) References Cited

U.S. PATENT DOCUMENTS

| 3,694,021 A | 9/1972 | Mullen |
| 3,927,424 A | 12/1975 | Itoh |
| 4,834,443 A | 5/1989 | Crowder et al. |

(Continued)

OTHER PUBLICATIONS

C. Gosselin, T. Laliberte, and T. Degoulange, "Underactuated robotic hand," in Video Proc. of the IEEE Intl. Conf. on Robotics and Automation, 1998. (Abstract only).

(Continued)

*Primary Examiner* — Stephen Vu
(74) *Attorney, Agent, or Firm* — Seed IP Law Group PLLC

(57) ABSTRACT

A tendon-driven robotic gripper is disclosed for performing fingertip and enveloping grasps. One embodiment comprises two fingers, each with two links, and is actuated using a single active tendon. During unobstructed closing, the distal links remain parallel, creating exact fingertip grasps. Conversely, if the proximal links are stopped by contact with an object, the distal links start flexing, creating a stable enveloping grasp. The route of the active tendon and the parameters of the springs providing passive extension forces are optimized in order to achieve this behavior. An additional passive tendon is disclosed that may be used as a constraint preventing the gripper from entering undesirable parts of the joint workspace. A method for optimizing the dimensions of the links in order to achieve enveloping grasps of a large range of objects is disclosed and applied to a set of common household objects.

14 Claims, 22 Drawing Sheets

(56) References Cited

U.S. PATENT DOCUMENTS

| | | |
|---|---|---|
| 4,955,918 A | 9/1990 | Lee |
| 5,080,681 A | 1/1992 | Erb |
| 5,200,679 A | 4/1993 | Graham |
| 8,231,158 B2 | 7/2012 | Dollar et al. |

OTHER PUBLICATIONS

T. Laliberte, L. Birglen, and C. M. Gosselin, "Underactuation in robotic grasping hands," Machine Intelligence & Robotic Control, vol. 4, No. 3, pp. 1-11, 2002.

A. Dollar and R. Howe, "Joint coupling design of underactuated grippers," Proceedings of IDETC/CIE, ASME 2006 International Design Engineering Technical Conferences & Computers and Information I Engineering Conference, Philidelphia, PA, Sep. 10-13, 2006, 9 pages.

A. Dollar and R. Howe, "Simple, robust autonomous grasping in unstructured environments," in IEEE Intl. Conf. on Robotics and Automation, 2007, pp. 4693-4700.

N. Ulrich, R. Paul, and R. Bajcsy, "A medium-complexity compliant end effector," in IEEE Intl. Conf. on Robotics and Automation, 1988, pp. 434-436.

L. Birglen, T. Laliberte, and C. Gosselin, Underactuated Robotic Hands. Springer Tracts in Advanced Robotics, 2008. (This is a book. A synopsis is provided).

R. Kurtz and V. Hayward, "Dexterity measure for tendon actuated parallel mechanisms," in IEEE Intl. Conf. on Advanced Robotics, 1991, pp. 1141-1146.

A. Bicchi and D. Prattichizzo, "Analysis and optimization of tendinous actuation for biomorphically designed robotic systems," Robotica, vol. 18, pp. 23-31, 2000.

N. Pollard and R. Gilbert, "Tendon arrangement and muscle force requirements for humanlike force capabilities in a robotic finger," IEEE Intl. Conf. on Robotics and Automation, pp. 3755-3762, 2002.

J. Fu and N. Pollard, "On the importance of asymmetries in grasp quality metrics for tendon driven hands," in IEEE-RSJ Intl. Conf. on Intelligent Robots and Systems, 2006, pp. 1068-1075.

C. Gosselin, F. Pelletier, and T. Laliberte, "An anthropomorphic underactuated robotic hand with 15 Dofs and a single actuator," IEEE Intl. Conf. on Robotics and Automation, 2008, pp. 749-754.

C. Brown and H. Asada, "Inter-finger coordination and postural synergies in robot hands via mechanical implementation of principal components analysis," in IEEE-RSJ Intl. Conf. on Intelligent Robots and Systems, 2007, pp. 2877-2882.

M. C. Carrozza, G. Cappiello, S. Micera, B. B. Edin, L. Beccai, and C. Cipriani, "Design of a cybernetic hand for perception and action," Biol. Cybern., vol. 95, No. 6, pp. 629-644, 2006.

M. Mason and K. Salisbury, Robot hands and the mechanics of manipulation. MIT Press, 1985. (This is a book. A synopsis is provided).

M. Buss, H. Hashimoto, and J. Moore, "Dextrous hand grasping force optimization," IEEE Trans. on Robotics and Automation, vol. 12, pp. 406-418, 1996.

L.-W. Tsai, Robot Analysis. John Wiley & Sons, 1999. (This is a book. A synopsis is provided).

L. Han, J. Trinkle, and Z. Li, "Grasp analysis as linear matrix inequality problems," IEEE Trans. on Robotics and Automation, pp. 1261-1268, 1999.

S. Kwak, L. Blankevoort, and G. Ateshian, "A mathematical formulation for 3D quasi-static multibody models of diarthroidal joints," Comp. Meth. in Biomech. and Biomed. Eng., vol. 3, pp. 41-64, 2000.

M. Ciocarlie and P. Allen, "A constrained optimization framework for compliant underactuated grasping," Mech. Sciences, vol. 2, No. 1, 2011, pp. 17-26.

KINETIC AND DIMENSIONAL OPTIMIZATION FOR A TENDON-DRIVEN GRIPPER

CROSS-REFERENCE TO RELATED APPLICATION

This patent application is a continuation application of U.S. patent application Ser. No. 14/050,075, filed Oct. 9, 2013, now issued as U.S. Pat. No. 8,833,827 on Sep. 16, 2014.

BACKGROUND

1. Technical Field

The present disclosure relates generally to object manipulation devices, systems, and techniques, and more particularly to gripper configurations that may be utilized with robots and other mobility and/or actuation platforms.

2. Description of the Related Art

End-effectors for robots operating in unstructured environments are typically designed to satisfy multiple criteria. They must be versatile and capable, enabling manipulation of a wide range of objects and in many scenarios. At the same time, low complexity and cost can be key enablers for wide availability, a desirable feature both for research and development, and subsequent refinement into a product.

BRIEF SUMMARY

The various end-effector designs described herein employ a low-complexity approach. With the understanding that a gripper populating this part of the design space will inevitably lack a number of advanced capabilities, the described features can enable a wide range of tasks and handle many target objects.

The present disclosure focuses on stable grasping, and not in-hand manipulation such as changing the object's pose in hand or activating additional object degrees of freedom (e.g., pushing a button, pulling a trigger). The embodiments described herein achieve two types of grasps, which are particularly useful for performing numerous tasks. The first one, illustrated in FIGS. 1A-1C, is fingertip grasps, which is highly suitable for small objects, or for cases where fingers 102a, 102b (collectively 102) of a hand, gripper or end effector 104 cannot reach around an object 106a (e.g., because of the surface the object is resting on). The second type, illustrated in FIGS. 1D-1F, is that of enveloping grasps, where fingers 102 of the hand, gripper or end effector 104 create contacts around the circumference of an object 106b. These grasps are well suited for resisting a wide range of external disturbances, unlike fingertip grasps, which are easily affected by torques applied around the axis of contact.

In one implementation, the hardware starting point consists of two fingers 102a, 102b, each with two joints 108a, 108b (collectively 108), 110a, 110b (collectively 110) and links 112a, 112b (collectively 112), 114a, 114b (collectively 114). Using at least two revolute joints per finger 102 is motivated by the goal of achieving exact fingertip grasps, where the distal links 114a, 114b are perfectly parallel with respect to one another, throughout the range of motion of the fingers 102. Actuation is performed through a single motor (not shown in FIGS. 1A-1F) connected to all joints 108, 110 via a tendon (not shown in FIGS. 1A-1F), providing flexion forces. Extension is entirely passive, achieved with joint springs (not shown in FIGS. 1A-1F) and passive elastic tendons (not shown in FIGS. 1A-1F).

With a single motor driving four joints 108a, 110a, 108b, 110b, the hand (e.g. end effector) is underactuated. The choice between the type of grasp being performed (fingertip or enveloping) is not made actively, by controlling the actuators. Rather, type of grasp being performed happens passively through object contact, as the hand, gripper or end effector 104 mechanically adapts to the shape of the object 106a, 106b. When the hand, gripper or end effector 104 is closing unobstructed, the distal links 114a, 114b stay parallel with respect to one another in a fingertip grasp configuration. If the proximal links 112a, 112b are stopped by contact with an object (e.g., object 106b as best illustrated in FIG. 1E, the distal links 114a, 114b flex in, completing an enveloping grasp, as best illustrated in FIG. 1F). Furthermore, the ratio of torques applied at each joint 108, 110 cannot be changed at run-time, as the joints 108, 110 are not independently actuated, and must be optimized at design-time for stable grasps in as many cases as possible.

Passive transition between fingertip and enveloping grasps can also be seen in the MARS hand [1], which later evolved into the SARAH family of hands [2], both of which use four-bar linkages for actuation. The use of tendons in the embodiments presented herein comprise a more compact implementation that avoids protruding knuckles or joints, at the cost of reduced finger contact areas. Passively adaptive, optimized underactuated designs also include the Harvard Hand [3], [4] and the breakaway transmission mechanism [5] used in the Barrett hand (Barrett Technologies, Cambridge, Mass.). Both of these designs may be utilized to perform enveloping grasps, but are not optimized for exact fingertip grasps. A detailed and encompassing optimization study for underactuated hands, focusing mainly on four-bar linkages but with applications to other transmission mechanisms as well, can be found in [6].

An important body of work has also focused on the force generation capabilities of redundant or tendon-driven mechanisms in the context of studying the human hand [7], [8], [9], [10]. A number of studies have focused on highly underactuated anthropomorphic hand models [11], [12], [13]; the latter also makes use of the principles of passive adaptation. Finally, force generation has been studied extensively in the context of fully-actuated robotic hands, and a number of useful tools have been proposed; see [14], [15], [16], [17] and references therein for details.

This disclosure describes highly-capable single-actuator, two-finger grippers designed for both fingertip and enveloping grasps. This disclosure also presents a method for optimizing a route of the active and passive tendons, as well as the stiffness and pretensioning of the extensor springs, for achieving the desired behavior. At least one implementation employs an additional passive tendon as a constraint that prevents the hand, gripper or end effector from entering undesirable parts of the joint workspace. Also described is a method for optimizing absolute and relative dimensions of the links for achieving enveloping grasps of a desired family of objects, and apply the method to a large set of common household objects. Finally, we demonstrate a prototype hand, gripper, or end effector implementing the results of these optimizations.

DETAILED DESCRIPTION

II. Operation and Constraints

Figure 2A:
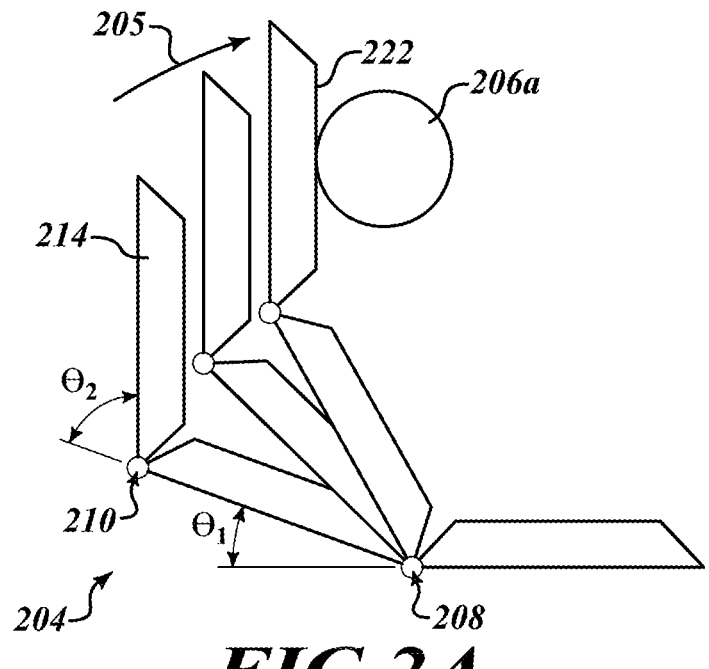
FIG. 2A a schematic view of a finger of a mechanical hand, gripper or end effector having a pair of opposed fingers each with a proximate and a distal link, successively moving to approach and grasp an object to be grasped, where the object to be grasp does not obstruct the proximate link, so results in a fingertips grasp, according to at least one illustrated embodiment.
Figure 2B:
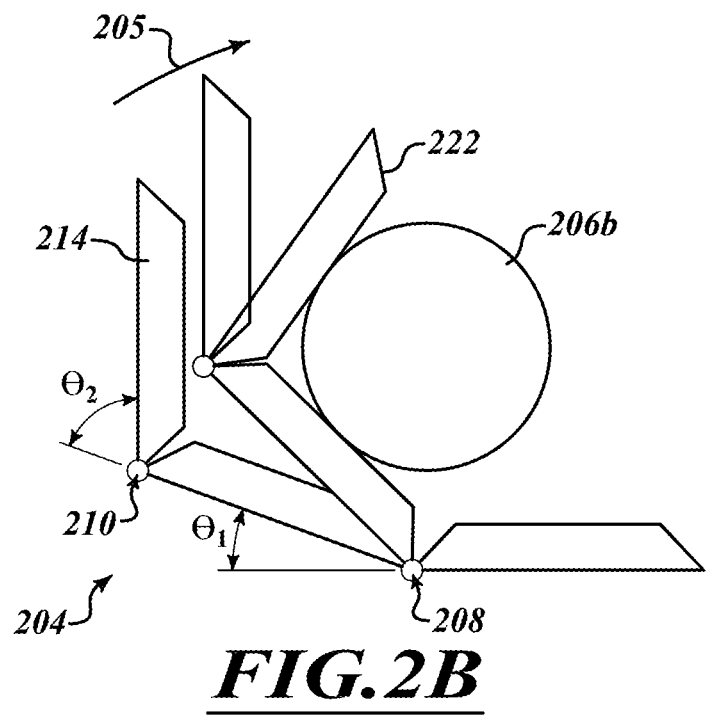
FIG. 2B a schematic view of the finger of a mechanical hand, gripper or end effector of FIG. 2A, successively moving to approach and grasp an object to be grasped, where the object to be grasp obstructs the proximate link, so passively results in an enveloping grasp, according to at least one illustrated embodiment.

One implementation uses a hand, gripper, or end effector model 204 shown in FIGS. 2A and 2B, in which the fingers 202a, 202b (collectively 202) are symmetrical. In particular, FIG. 2A shows one finger 204 of a hand, gripper, or end effector at three successive positions along a range of motion represented by arrow 205, approaching and contacting a relatively small object 206a in a fingertip grasp. In particular, FIG. 2B shows the one finger 204 at three successive positions along a range of motion represented by arrow 205, approaching and contacting a relatively large object 206b in an enveloping grasp. This disclosure focuses on the behaviors of a single finger 202 for ease of explanation, even though the various gripping described herein employs two fingers. The variables $\theta_1$ and $\theta_2$ denote the proximal and distal joint angles of the proximal and distal joints 208, 210, respectively. A single actuated tendon (e.g., flexor tendon 416 FIG. 4) flexes the joints 208, 210, with extensor tendons (e.g., 418, FIG. 4) and passive springs (e.g., linear spring 430, joint spring 432 FIG. 4) providing extension torques.

The desired behavior of the gripper 204 can be summarized through the following four constraints.

1) As the gripper 204 is closing unobstructed, distal links 214 must remain parallel along the range of motion 205, as illustrated in FIG. 2A. This means that as the proximal joint 208 flexes, the corresponding distal joint 210 extends to compensate (i.e., $\theta_1+\theta_2=90$ degrees throughout free motion).

2) If a fingertip grasp has been established, contact forces between the gripper 204 and an object 206a must create a stable grasp. In particular, contact forces on the fingertips 222 should not hyperextend the distal joint 210 (i.e., $\theta_1+\theta_2=90$ degrees must hold in the presence of fingertip contact forces).

3) If proximal joints 208 are stopped due to contact with an object 206b, the distal joint 210 must start flexing, as illustrated in FIG. 2B, in order to contact the object 206b (i.e., $\theta_1+\theta_2>90$ degrees).

4) Once an enveloping grasp (FIG. 2B) has been completed, object contact forces and joint torques created by the actuated tendon (e.g., flexor tendon 416 FIG. 4) must be in equilibrium and create a stable grasp.

Figure 3A:
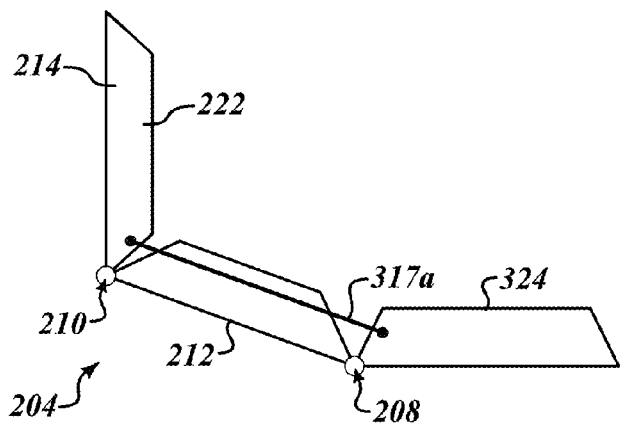
FIG. 3A is a schematic view of a finger and palm of a mechanical hand, gripper or end effector having a pair of opposed fingers each with a proximate and a distal link, showing a passive tendon or string directly physically coupling a palm link with the distal link, according to at least one illustrated embodiment.

We note that, for all constraints above, $\theta_1+\theta_2$ is greater than or equal to 90 degrees is a necessary, but not sufficient condition. This constraint can be enforced with an additional unactuated tendon. The most straightforward implementation is the passive tendon 317a shown in FIG. 3A, with the additional passive tendon (e.g., string) 317a connecting a palm 324 directly to the distal joint 210. The mechanism essentially acts as a four-bar linkage, preventing the case where $\theta_1+\theta_2<90$ degrees throughout the range of motion 205 of the gripper 204. However, the mechanism allows configurations where $\theta_1+\theta_2>90$ degrees, as the passive tendon 317a (e.g., string), that completes the four-bar linkage, simply loses tension and goes slack.

Figure 3B:
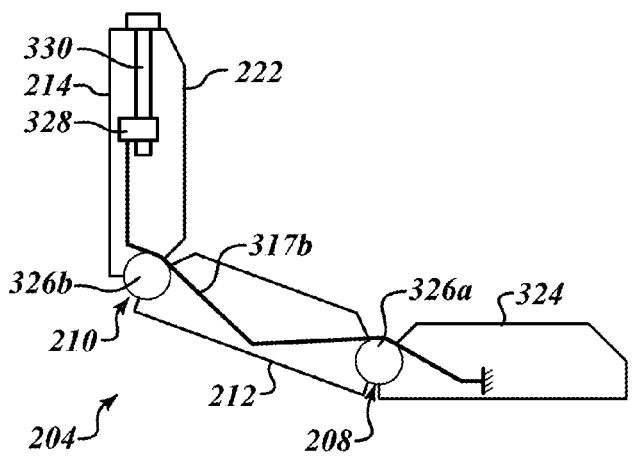
FIG. 3B is a schematic view of a finger and palm of a mechanical hand, gripper or end effector having a pair of opposed fingers each with a proximate and a distal link, showing a passive tendon physically coupling a palm link with the distal link via a pair of mandrels at a pair of joints between the links, as well as a length adjusting mechanism operable to adjust a length of the passive tendon, according to at least one illustrated embodiment.

In practice, this constraint is implemented with a passive tendon 317b constrained to wrap around a number of mandrels 326a, 326b (collectively 326) of equal radii around both joints 208, 210, as shown in FIG. 3B. This has the advantage of allowing better control of the tendon route inside the fingers 204. That is, as long as the passive tendon 317b wraps around both joint mandrels 326, the rest of the route can be changed as needed in order to avoid collision with other design elements. This implementation can also scale to future gripper versions with more links per finger 204, e.g., a single passive tendon 317b can traverse multiple joints enforcing similar constraints.

In both implementations, small variations in the length of the passive tendon 317 (e.g., string that enforces the constraint can lead to noticeable deviations in distal link 214 poses. The second variant above allows use of a simple mechanism housed in the distal link 214. The passive tendon 317b terminates inside a small piece 328 that sits on a screw 330, as shown in FIG. 3B. Turning the screw 330 allows fine adjustments in the length of the passive tendon 317b.

III. Optimization of Kinetic Behavior

Figure 1A:
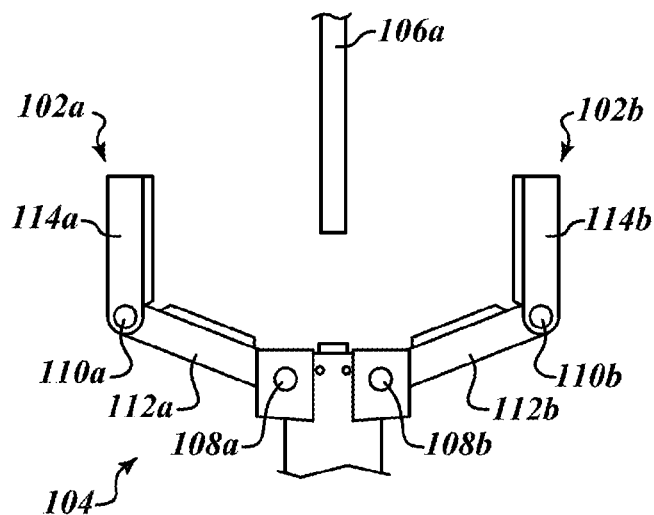
FIGS. 1A-1C are successive views of a mechanical hand, gripper or end effector having a pair of opposed fingers which approach and grasp an object to be grasped in a fingertips grasp, according to at least one illustrated embodiment.
Figure 1B:
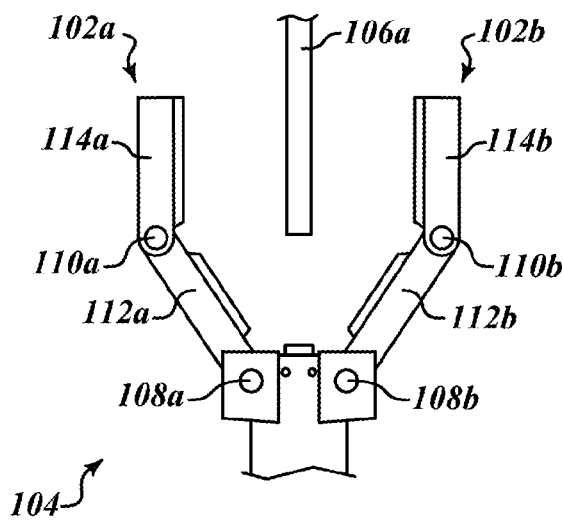
Figure 1C:
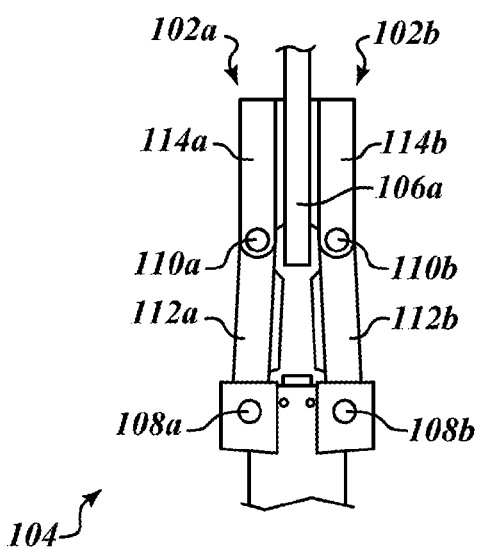
Figure 1D:
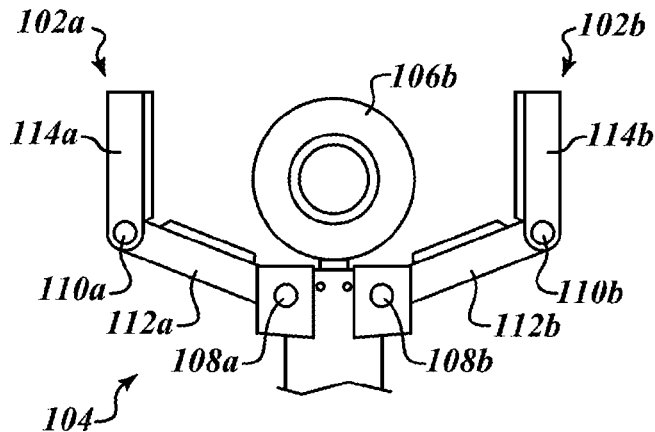
FIGS. 1D-1F are successive views of a mechanical hand, gripper or end effector having a pair of opposed fingers which approach and grasp an object to be grasped in an enveloping grasp, according to at least one illustrated embodiment.
Figure 1E:
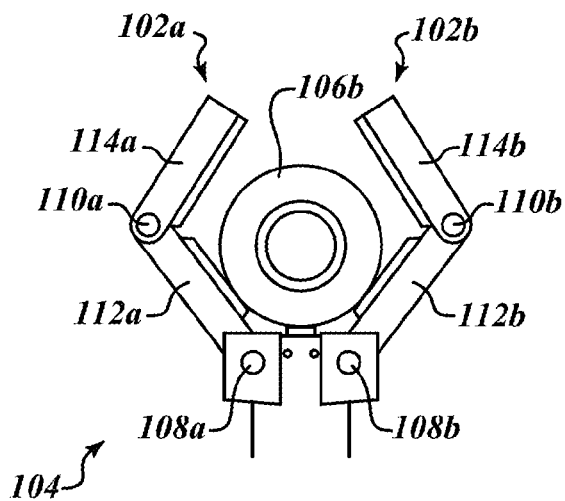
Figure 1F:
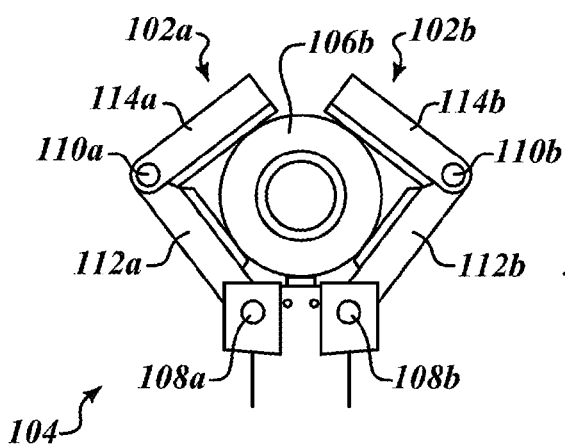

The hardware constraint described in the previous section contributes significantly to achieving the desired behavior, but does not suffice by itself. In particular, it does not ensure that constraint 1) is met (i.e., distal links 114a, 114b (FIGS. 1A-1C) remain parallel to one another throughout unobstructed closing). It also does not contribute in any way to constraint 4) (i.e., stable contact forces during enveloping grasps, e.g., FIG. 1D). In one implementation, in order to meet all the constraints in the list, and ensure the complete desired behavior, a number of parameters in the design are optimized. In particular, parameters pertaining to both the active flexor tendon 416 (FIG. 4) and the passive, spring-based extension mechanism (e.g., extensor tendon 418, spring 420, mandrels 418 of FIG. 4) are optimized. In this context, the term "kinetic" is used to refer to the effect of net joint torques on both the motion of the fingers 204 and the forces transmitted to an object 206a, 206b (FIGS. 2A, 2B) through contacts.

A. Optimized Design Parameters

Figure 4:
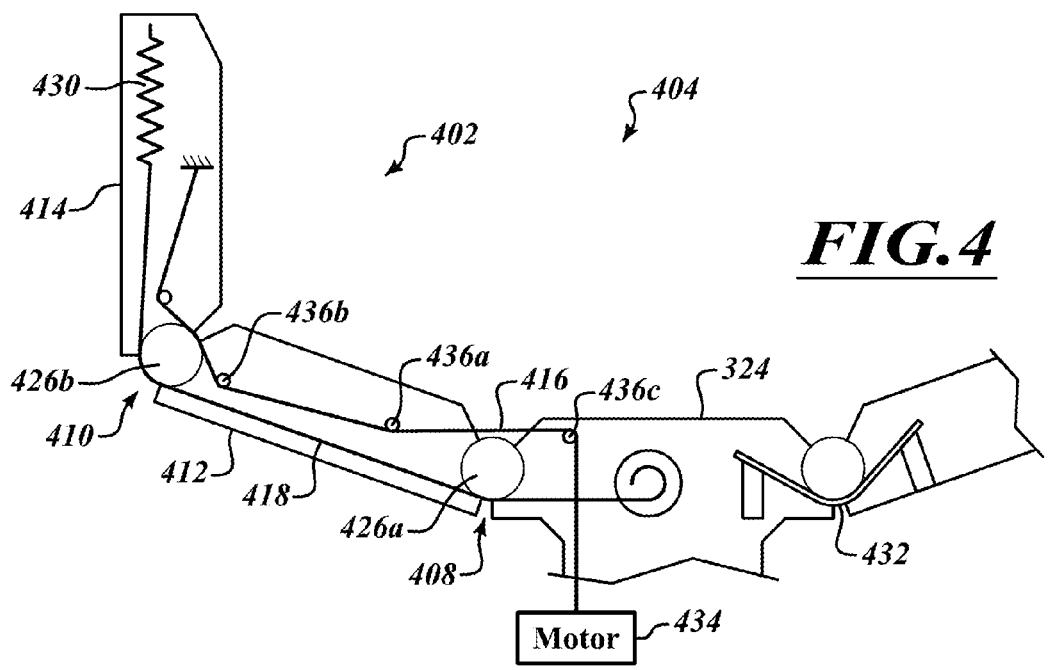
FIG. 4 is a schematic view of a mechanical hand, gripper or end effector having a pair of opposed fingers (only a portion of a right side finger is shown), showing a actuatable flexor tendon coupled to a motor and a passive extensor tendon physically coupled to a spring, and joint springs (only one illustrated) located at joints between the links, as well as a tensioning mechanism operable to adjust a tension in the passive extensor tendon, according to at least one illustrated embodiment.

As illustrated in FIG. 4, a complete gripper mechanism 404 (only a portion illustrated) contains three main components that determine its behavior, namely: 1) flexor tendon 416, 2) joint spring 432, and 3) extensor tendon 418. The effect of each of these main components is determined by a number of parameters, detailed in the following list and illustrated in FIG. 4.

1) Flexor Tendon 416

In this implementation, the flexor tendon 416 is the only component connected to a motor 434, and is the only major component that can be actively controlled at runtime. In use, the common tendon-pulley model (as in [18]) made be employed. The common tendon-pulley model assumes that the flexor tendon 416 travels through a number of routing points 436a, 436b, 436c (three illustrated in FIG. 4, collectively 436) that the flexor tendon 416 can slide through, but that force a path of the flexor tendon 416 to change direction. As a result of this change in direction, the routing points 436 are the locations where the flexor tendon 416 applies force to the links 412, 414 of the finger 402. The parameters which can be optimized are: locations of routing points 436, radii of joint mandrels 426a, 426b radii, spring stiffness and tension of joint springs 432.

The locations of the routing point 436, relative to the joints 408, 410, determine the joint torques applied by the flexor tendon 416.

As previously explained, the flexor tendon 416 can also wrap around joint mandrels 426a, 426b. As long as the flexor tendon 416 is touching a mandrel 426, its moment arm around that joint mandrel 426 is constant and equal to the radius of the joint mandrel 426. It is possible for the flexor tendon 416 to detach from the joint mandrel 426 during operation, in which case the moment arm is determined by the routing points 436c proximal and distal 436a, 436b to that joint mandrel 426.

Each joint 408, 410 contains an off-the-shelf torsional spring 432 (only one shown in FIG. 4 and illustrated on the opposite finger for sake of clarity of illustration). The spring stiffness may be optimized for the application. For example, changes in spring stiffness may be made in discrete steps, constrained by availability in manufacturers' catalogs.

Additionally, the springs 432 can be pre-tensioned to exert some level of torque even in the gripper's 404 fully extended pose. The amount of pretensioning can be changed by varying a location of the spring leg supports inside the proximate and distal links 412, 414, and palm link 324 (which constitutes a link), and by choosing springs 432 with various leg angles at rest.

In addition to joint springs 432, extension torques are provided by a passive tendon 418. The extensor tendon 418 runs along an extension side of the joint 408, 410, hence is interchangeably referred to as extensor tendon 418 herein, and is connected to a linear spring 430. Compared to joint springs 432, the extensor tendon 418 has two main advantages. First, a change in length of the extensor tendon 418 is determined by the relationship between the two joints 408, 410, as flexion at one joint 408/410 can be offset by extension of the other joint 410/408. Second, the moment arms around the joints 408, 410 can be finely controlled through the radii of the joint mandrels 426a, 426b, respectively. The linear spring stiffness parameter may be optimized. For example, changes may be made in discrete steps, constrained by off-the-shelf availability.

A pre-tensioning level in the linear spring 430 may be optimized. The pre-tensioning level is determined by a length of the extensor tendon 418, and thus a length of the linear spring 430) in the fully extended pose of the gripper 404. A pretensioning mechanism allows this parameter to be adjusted after the gripper 404 has been constructed.

The radii of the joint mandrels 426 may be optimized. Similarly to the flexor tendon 416, the joint mandrel radii determine the constant moment arm of the extensor tendon 416 around each joint 408, 410. Note that, unlike the flexor tendon 416, the geometry of the gripper 404 constrains the extensor tendon 418 to always wrap around the mandrels 426, and additional routing points do not affect its behavior.

The above parameters are used to compute the resulting joint torque applied at both joints 408, 410 of the finger 402 via Equation 1 (below), as a function of the joint angles $\theta_1$, $\theta_2$ and the actuation force f applied to the active tendon.

$$\tau_\tau = [\tau_1, \tau_2]^T \qquad \text{Equation 1}$$

Essentially, the joint torque sums the effect of the active flexor tendon 416 and passive extensor tendon 418, as well as joint springs 432, as per Equation 2 (below), where Ja and Jp are the Jacobians of the routing points 436 of the active flexor and passive extensor tendons 416, 418, respectively, k1 and $\Delta_1$ are the stiffness and elongation of the linear spring 430 attached to the extensor tendon, Kj is a diagonal matrix comprising the stiffness coefficients of the joint springs 432, and $\Delta\theta$ is the vector of joint displacements relative to the rest pose of joint springs 432.

$$\tau_r(f,\theta) = J_a f_a + J_p k_1 \Delta l + K_j \Delta\theta \qquad \text{Equation 2}$$

B. Joint Torque Ratios and Constraints

For a given gripper pose and tendon force, a factor in determining the direction of infinitesimal joint motion or the stability of forces applied to the object is the ratio of individual joint torques $\tau_1$ and $\tau_2$, rather than their absolute values. As such, all constraints will be on the normalized value of $\tau_r$, denoted by $\hat{\tau}_r$.

Figure 5A:
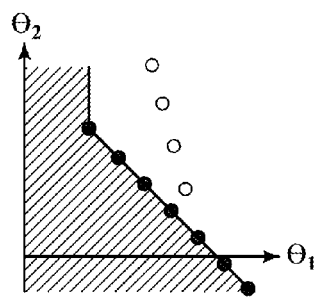
FIG. 5A is a graph of link angles $\theta_1$ and $\theta_1$ for fingertip and enveloping poses in a joint pose space, according to at least one illustrated embodiment.

The latter (T-hat-r) essentially defines a direction in joint torque space; thus will express constraints in terms of this direction. The behavior of the gripper is checked at a number of discrete points throughout its workspace. In particular, two sets of poses are created by taking equidistant samples from the workspace, as illustrated in FIG. 5A. This includes fingertip poses (illustrated by line with black dots or dark circles) and enveloping poses (illustrated by line with white dots or undarken circles).

The fingertip poses comprise a set of poses where the distal links (e.g., 114a, 114b of FIGS. 1A-1C) are parallel ($\theta_1 + \theta_2 = 90$ degrees). It is noted that the effect of the hardware constraint prevents the distal joint 110a, 110b from hyperextending (cross-hatched region in FIG. 5A), for instance due to the additional tendon constraint from Sec. II.

The enveloping poses comprise a set of poses where the distal joint 110a, 110b is flexed for an enveloping grasp ($\theta_1 + \theta_2/2 = 90$ degrees).

In experimental implementation, the sets contain 11 and 7 poses respectively; which appears to provide a sufficient sampling resolution to ensure desired behavior throughout the joint workspace.

The active tendon force may be defined or grouped into four levels of active tendon force: a) parallel closing force fclose, b) enveloping force fenvel, c) grasping force fief, and d) opening force, which are each explained in turn below.

The parallel closing force fclose is the active force that closes the gripper while maintaining parallel distal links 114a, 114b (FIG. 1). In this regime, the proximal joint 108a, 108b (FIG. 1) must flex, but the distal joint 110a, 110b (FIG. 1) must extend to compensate.

The enveloping force fenvel is the active force applied once the proximal links 112a, 112b (FIG. 1) are stopped due to object contact and that flexes the distal joints 114a, 114b (FIG. 1) creating an enveloping grasp.

The grasping force finf is the force applied once an object 106a, 106b has been grasped, in order to hold the object 106a, 106b stably. The grasping force finf can be arbitrarily large, constrained only by the power of the motor 434 (FIG. 4) and the links' structural rigidity. Of the grasping force finf is considered to be large enough so that the effects of the spring-based forces in the system are negligible, thus Equation 2 may be simplified as Equation 3, below, by ignoring the other term.

$$\tau_r(f_{inf}, \theta) = J_c f_{inf} \qquad \text{Equation 3}$$

The opening force is the force for extending the gripper, f=0.

For every combination of gripper pose and tendon force, the resultant joint torque $\tau_r(f, \theta)$ can be computed, as in Eq. (1). We also define a normalized joint torque eq, resulting from potential contacts with the object, as per Equation 4, below $$\tau_{eq}(\theta) = J_c c(2) \qquad \text{Equation 4}$$

In Equation 4, Jc is the Jacobian of contact locations on the gripper, and c is the vector of contact forces. For fingertip poses, a single contact located in the center of the distal link is assumed. For enveloping poses, an additional contact located at the center of the proximal link is assumed. All contact force magnitudes are normalized to 1.

Figure 6:
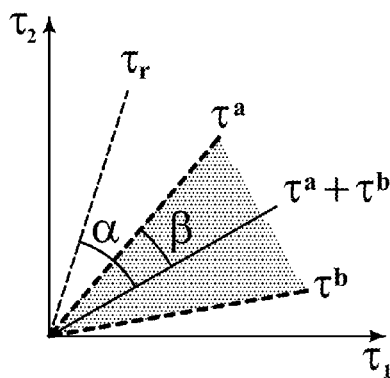
FIG. 6 is a graph showing angles $\alpha$ and $\beta$ are used to define a distance metric from the vector $\tau_r$ to the cone defined by $\tau^0$ and $\tau^1$, according to at least one illustrated embodiment.

It is now possible to compute an overall measure of whether a particular set of design parameters creates the desired behavior. For each pose in the fingertip and enveloping sets, the torque ratio constraints explained below, and illustrated in FIG. 6, are defined. In FIG. 6, angles α and β are used to define a distance metric from the vector $\tau_r$ to the cone defined by $\tau^0$ and $\tau^1$.

Figure 5B:
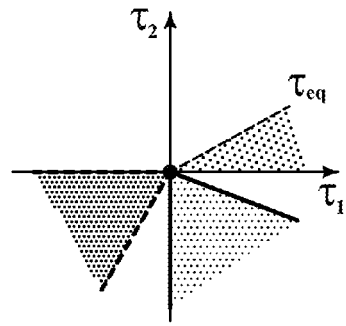
FIG. 5B is a graph of joint torque ration constraints for a fingertip pose, according to one illustrated embodiment, showing constraints for parallel closing, grasping and opening regimes.

For each pose in fingertip poses (FIG. 5B), for the parallel closing regime: the gripper 104 (FIG. 1) must stay in the mode where the distal links 114a, 114b (FIG. 1) are parallel. Thus, the proximal joint 108a, 108b (FIG. 1) must flex, but the distal joint 110a, 110b (FIG. 1) must extend to compensate. This is achieved if fclose is strong enough to overcome spring forces at the proximal joint 108a, 108b (FIG. 1), but not at the distal joint 110a, 110b (FIG. 1), as illustrated by the cone in the lower right quadrant.

Also for each pose in fingertip poses, for the enveloping and grasping regimes: tendon force must overcome the spring forces and flex the distal joint 110a, 110b (FIG. 1) as well. However, the ratio of distal to proximal torques must not exceed the level that can be supported by contact with the object, as illustrated by the cone in the upper right quadrant.

If τ2 it too large relative to τ1, the distal joint will flex and, as in [6], the finger will "eject" from the object. The reverse effect is not an issue as the distal joint 110a, 110b (FIG. 1) cannot hyperextend due to hardware constraints.

Further for each pose in fingertip poses, for the opening regime: with no active force applied, the gripper must return to the extended pose, as illustrated by the cone in the lower left quadrant.

For each pose in enveloping poses (FIG. 5C), for the parallel closing regime: the finger must return to a pose where the distal links are parallel, as illustrated by the cone extending across portions of the lower left and lower right quadrants.

Also for each pose in enveloping poses, for the grasping regime: applied joint torques must be as close as possible to $\tau_{eq}$, the level that can be supported by object contacts as illustrated the line extending from the origin into the upper right quadrant. In order to have a stable grasp for frictionless contacts, $\tau_r$ and $\tau_{eq}$ must overlap perfectly. However, in real life, there is always some amount of friction that can be supported at the contact, creating stable grasps even if $\tau_r$ and $\tau_{eq}$ do not overlap perfectly. By trying to bring $\tau_r$ as close as possible to $\tau_{eq}$, we attempt to maximize the set of stable grasps, even for low levels of friction.

Figure 5C:
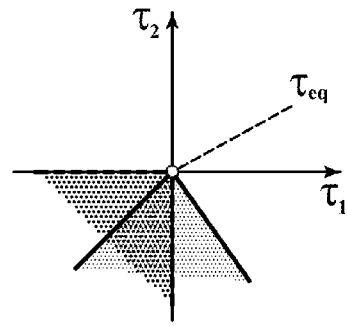
FIG. 5C is a graph of joint torque ration constraints for an enveloping pose, according to one illustrated embodiment, showing constraints for parallel closing, grasping and opening regimes.

Further for each pose in enveloping poses, for the opening regime: the gripper must return to the fully extended pose, as illustrated by the cone in the lower left quadrant, which partially overlaps with the cone that extends across the lower left and lower right quadrants in FIG. 5C.

C. Error Metrics and Optimization Function

To translate the list of constraints above into a function that can be optimized, first error metrics that quantify whether a given constraint is violated must be defined. For the constraint that requires T-hat-r to be as close as possible to $\tau_{eq}$, the error metric given by Equation 5, below, is minimized.

$$DIST(\tau_r, \tau_{eq}, w) = \left(\frac{1 - \hat{\tau}_r \cdot \tau_{eq}}{w}\right)^2 \qquad \text{Equation 5}$$

In Equation 5, w is a scaling parameter that allows us to determine how quickly the error grows away from the constraint.

The second type of constraint requires $\tau_r$ to be inside a cone, defined for example by $\tau^a$ and $\tau^b$. For satisfying this type of constraint, we attempt to minimize the error metric, as provided in Equation 6, below.

$$CNDIST(\tau_r, \tau^a, \tau^b) = \left(\frac{1 - \hat{\tau}_r \cdot (\widehat{\hat{\tau}^a + \hat{\tau}^a})}{1 - \hat{\tau}^a \cdot (\widehat{\hat{\tau}^a + \hat{\tau}^b})}\right)^2 \qquad \text{Equation 6}$$

This is equivalent to the formulation given in Equation 7, below.

$$CNDIST(\tau_r, \tau^a, \tau^b) = \left(\frac{1 - \cos\alpha}{1 - \cos\beta}\right)^2 \qquad \text{Equation 7}$$

With α and β defined as shown in FIG. 6.

The overall measure is then computed by summing the values of the error metrics for violations of each constraint. The exact formulation, implementing the constraints described in the previous subsection and illustrated in FIGS.

5A-5C, is shown in Alg. 1, below. The optimization goal is to find the set of parameters that minimize the resulting value of S.

---
Algorithm 1 Computation of optimization function.
---
1: S = 0                                                          Alg. 1
2: for all $\theta_i$ in fingertip_poses do
3:     $S \stackrel{+}{=}$ CNDIST $[\tau_r (f_{close}, \theta_i), (0, -1)^T, (1, -0.5)^T]^2$
4:     $S \stackrel{+}{=}$ CNDIST $[\tau_r (f_{envel}, \theta_i), (1, 0)^T, \tau_{eq} (\theta_i)]^2$
5:     $S \stackrel{+}{=}$ CNDIST $[\tau_r (f_{inf}, \theta_i), (1, 0)^T, \tau_{eq} (\theta_i)]^2$
6:     $S \stackrel{+}{=}$ CNDIST $[\tau_r (0, \theta_i), (-1, 0)^T, (-0.4, -1)^T]^2$
7: end for
8: for all $\theta_i$ in enveloping_poses do
9:     $S \stackrel{+}{=}$ CNDIST $[\tau_r (f_{close}, \theta_i), (-1, -1)^T, (0.8, -1)^T]$
10:    $S \stackrel{+}{=}$ DIST $[\tau_r (f_{inf}, \theta_i), \tau_{eq} (\theta_i), 1.0e^{-3}]^2$
11:    $S \stackrel{+}{=}$ CNDIST $[\tau_r (0, \theta_i), (-1, 0)^T, (0, -1)^T]^2$
12: end for
13: return $\sqrt{S}$

---

D. Optimization Method

Optimization was performed using a combination of random search and gradient descent with numerical gradient computation. At each step, a random set of parameters may be chosen and the corresponding value of S is computed. If S is below a given threshold, a gradient descent loop is run, where a step is taken in the direction of the numerically computed gradient until S stops improving. The resulting parameter set is then saved into a database. The overall algorithm can be allowed to run for an arbitrarily chosen amount of time, after which point the configuration with the lowest value of S found so far can be used.

In practice, for a parameter space of dimensionality 16, it was found that one computation of the function S takes approximately 19 ms, while computation of the numerical gradient takes approximately 0.6 s. A rigorous analysis of the time required for the best solution to stop improving was not performed; however empirically, it was found that after approximately 60 CPU hours of computation (8 to 10 hours on a single multi-core commodity desktop) no significant improvements can be obtained.

In future work, different optimization algorithms may be tried, suited for large dimensional parameter spaces and highly non-linear optimized functions, such as simulated annealing. Other possible approaches could include casting the optimization function to a formulation that allows efficient computation of the global optimum, such as a Linear or Quadratic Program, as in [19].

IV. Optimization of Link Dimensions

Based on the kinetic optimization described so far, the subject gripper can execute both fingertip and enveloping grasps. The main reason for pursuing these capabilities is to increase the versatility of the gripper; however, in order to maximize their benefit focus should also be directed on the range of objects on which such grasps can be executed.

Figure 7A:
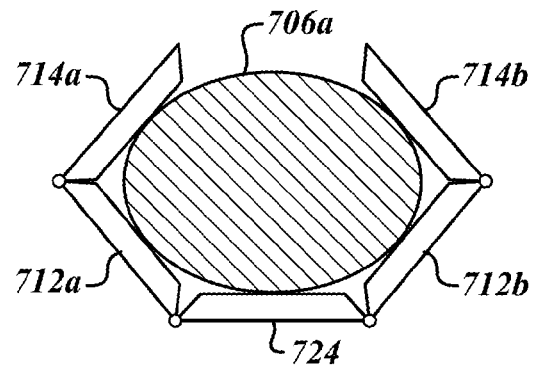
FIG. 7A is a schematic view of a pair of opposed fingers and palm of a mechanical hand, gripper or end effector, of the fingers having respective proximate and a distal links, illustrating a successful enveloping grasping of an object, according to at least one illustrated embodiment.
Figure 7B:
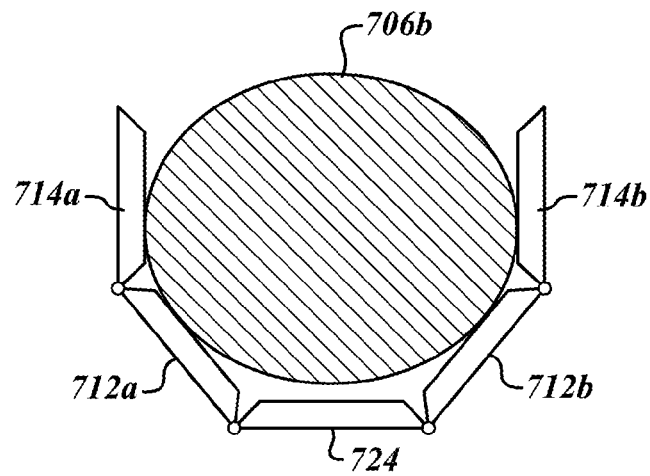
FIG. 7B is a schematic view of the pair of opposed fingers and palm of the mechanical hand, gripper or end effector of FIG. 7A, illustrating an equivalent of a fingertip grasping of an object which is oversized for the mechanical hand, gripper or end effector, according to at least one illustrated embodiment.

Fingertip grasps are relatively straightforward in terms of graspable object dimensions: the widest object that can grasped must fit between the fingers in the fully extended pose; the thinnest one can be arbitrarily thin (e.g. a sheet of paper). However, enveloping grasps are more difficult to execute. FIGS. 7A-7B illustrate potential successful and unsuccessful enveloping grasps based on the dimensions of the grasped object. The determining factors for the range of objects 706a, 706b, 706c (collectively 706) that the gripper can geometrically envelop are the lengths and thicknesses of the links 712a, 712b, 714a, 714b, 724. We propose a second type of optimization, aiming to maximize this range.

Figure 8A:
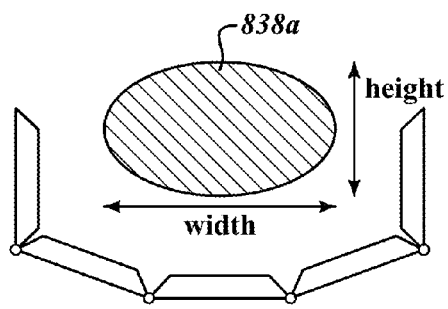
FIG. 8A is a schematic view of the pair of opposed fingers and palm of the mechanical hand, gripper or end effector of FIG. 7A and an object to be grasped having an elliptical object profile, according to at least one illustrated embodiment.
Figure 8B:
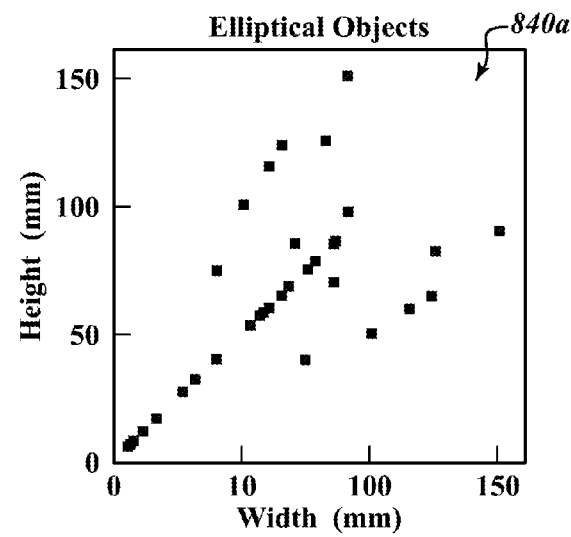
FIG. 8B is a graph showing dimensions of a space of common household objects with elliptical object profiles.
Figure 8C:
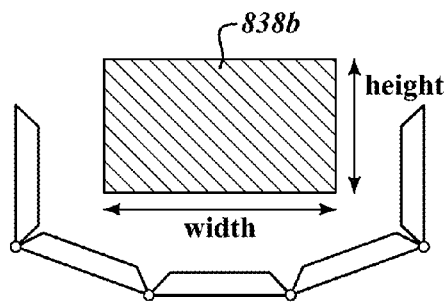
FIG. 8C is a schematic view of the pair of opposed fingers and palm of the mechanical hand, gripper or end effector of FIG. 7A and an object to be grasped having a rectangular object elliptical profile, according to at least one illustrated embodiment.

The space of possible objects may be parameterized by dividing the 2D profiles 838a, 838b (collectively 838) illustrated in FIGS. 8A and 8C of the objects 706 into two categories: rectangular and elliptical. For each category, the object profile 838 is defined by its width and height.

Figure 8D:
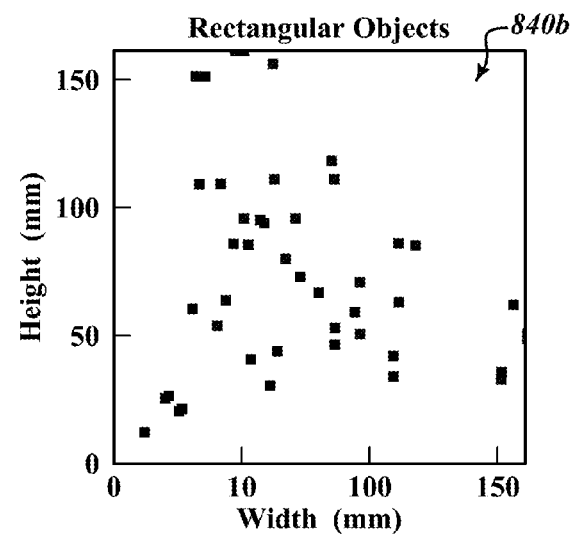
FIG. 8D is a graph showing dimensions of a space of common household objects with rectangular object profiles.

The parts of the object space that are most important for a gripper to cover will be application-specific. For a gripper intended for versatile manipulation in human settings, a set (n=62) of objects common in households and offices was measured, such as glasses, mugs, bottles, cans, pens, cellphones, various product boxes, staples, condiment packs, computer mice, etc. An illustration of the elliptic object space 840a and 2D rectangular object space 840b is shown in FIGS. 8B and 8D, respectively, populated by the objects that were measured. Notably, spaces are symmetrical as objects can be approached from either direction.

A. Optimization Function

We optimized 6 parameters that affect the space of objects the gripper can geometrically enclose: length and thickness of the palm, proximal and distal links. For each set of parameters, the optimization function was defined as the number of discrete samples in the object space interest region that the gripper failed to enclose. Each object was approached by the gripper along a direction aligned with its height axis, and centered along the object's width. An enveloping grasp was defined as successful if the following conditions were met.

1) Contact is established on all four links of the gripper.

2) $\theta_1$ greater than or equal to 45 degrees: as the gripper is underactuated, the proximal joints stop flexing only when contact with an object prevents further motion; only at that point do the distal joints start flexing. The exact angle where that happens depends on the friction coefficient between the proximal link and the object. We chose a value of 45 degrees, which corresponds to a friction coefficient of 1.

3) $\theta_1 + \theta_2$ greater than or equal to 110 degrees: this condition distinguishes an enveloping grasp from a fingertip grasp (FIG. 7B).

Figure 7C:
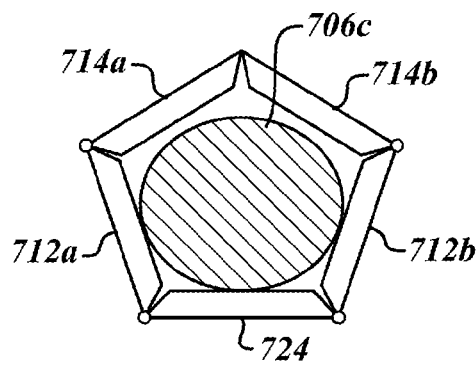
FIG. 7C is a schematic view of the pair of opposed fingers and palm of the mechanical hand, gripper or end effector of FIG. 7A, illustrating fingertips colliding when attempting to grasp of an object which is undersized for the mechanical hand, gripper or end effector, according to at least one illustrated embodiment.

4) The opposing fingertips do not collide as they are flexing to complete the enveloping grasp (FIG. 7C).

Based on the distribution of measured objects, the following object space regions of interest were empirically defined.

A) Since circular objects are more predominant than non-circular elliptical ones, attention was focused on circular objects with diameters between 40 mm and 90 mm, sampled every 10 mm. Objects with diameters between 50 mm and 60 mm were given double weight (69 discrete samples in total).

B) Rectangular objects with width and height between 40 mm and 100 mm, independently sampled at every 10 mm (49 samples in total).

It is important to note that this type of object space sampling is far from complete. It does not explicitly address objects with irregular shapes, or objects approached by the gripper along a direction that is offset from the center and not aligned with a major object axis. In practice, explicitly optimizing for this particular subset of object shapes, and relying on the gripper's passive mechanical adaptation to handle deviations from it, has been found to work well in a wide range of situations, as illustrated in the next section.

It is also noted that the space of enveloping grasps is always complemented by the space of fingertip grasps, which is significantly less constrained. This is the reason for choosing to focus enveloping grasps on the relatively large objects in the set, with an assumption that fingertip grasps are well suited for small objects.

B. Optimization Results

The same optimization method described in Sec. III-D is used, with the parameters and function described in the previous subsection. For this function, a single evaluation took approximately 0.25 s, and computation of the numerical gradient took approximately 3 s. Complete optimization times similar to the ones in Sec. III-D were allowed.

The best parameter values we found are shown in Table I.

TABLE I

Dimensions for Optimized Gripper.

|  | Palm | Prox. link | Dist. link |
| --- | --- | --- | --- |
| Length (mm) | 35 | 65 | 53 |
| Thickness (mm) | 9 | 8 | 7 |

Figure 9A:
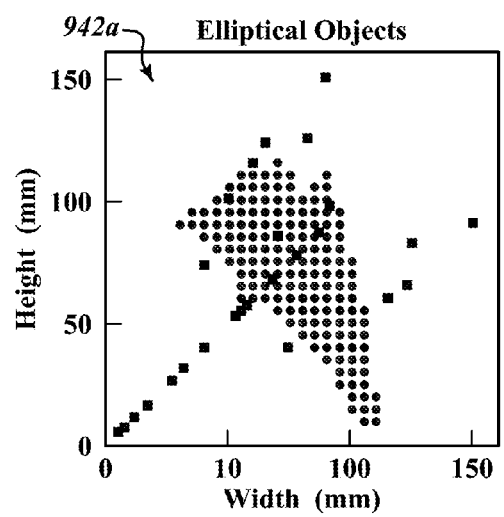
FIG. 9A is a graph showing dimensions of a space of objects with elliptical object profiles which a mechanical hand, gripper or end effector optimized per dimensions of Table I can successfully grasp in an enveloping grasp.
Figure 9B:
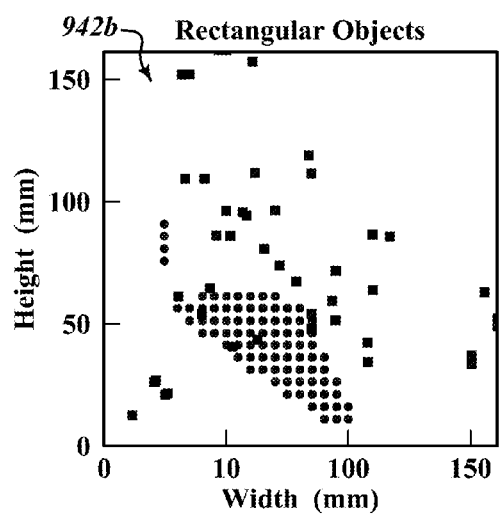
FIG. 9B is a graph showing dimensions of a space of objects with rectangular object profiles which a mechanical hand, gripper or end effector optimized per dimensions of Table I can successfully grasp in an enveloping grasp.
Figure 9C:
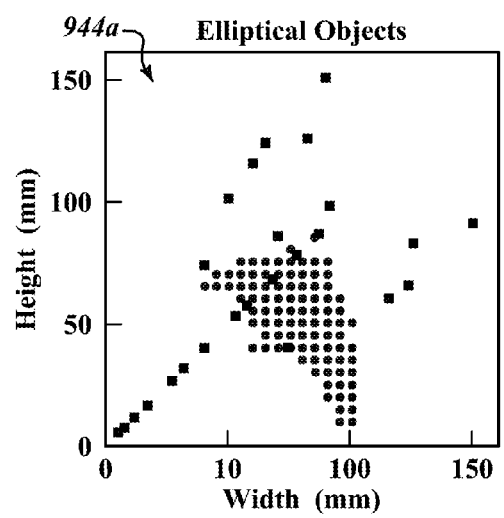
FIG. 9C is a graph showing dimensions of a space of objects with elliptical object profiles which a mechanical hand, gripper or end effector not optimized per dimensions of Table I can successfully grasp in an enveloping grasp, for comparison with that of FIG. 9A.
Figure 9D:
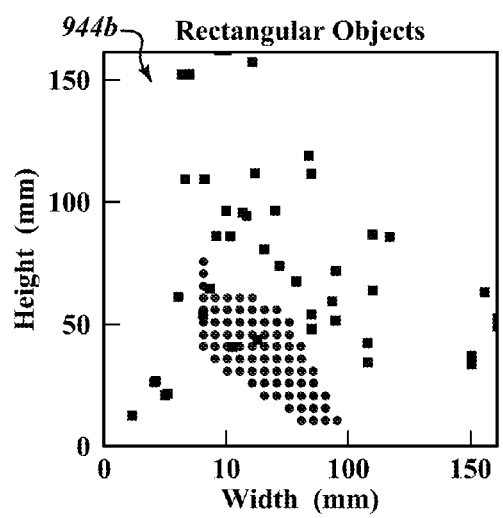
FIG. 9D is a graph showing dimensions of a space of objects with rectangular object profiles which a mechanical hand, gripper or end effector not optimized per dimensions of Table I can successfully grasp in an enveloping grasp, for comparison with that of FIG. 9B.

The corresponding ranges 942a, 942b of objects that the gripper can envelop are shown in FIGS. 9A, 9B for elliptical and rectangular objects, respectively. For comparison, FIGS. 9C, 9D show the corresponding ranges 944a, 944b of objects that an unoptimized gripper can envelope for elliptical and rectangular objects, respectively, with all link lengths equal to 50 mm and thicknesses equal to 8 mm.

Notably, the optimization method produces improved coverage of the object space, allowing for enveloping grasps of a wide range of objects. However, many common objects still cannot be enveloped; for those, this particular model must rely on fingertip grasps. In the future, we plan to study additional methods for improving the range of objects that can be envelop; these can include overlapping fingers, interlocking distal links, or multiple fingers offset from each other in the plane perpendicular to the closing direction, as in [4].

V. Prototype and Demonstration

In order to build a gripper 1004 (FIG. 10) with the desired characteristics, first the optimization presented in the previous section was run, resulting in the set of desired link dimensions. Then, based on these results, the kinetic optimization presented in Sec. III was run, computing the parameters of the actuation mechanism. Using the notation in FIG. 10, the parameters used for the kinetic optimization are set out immediately below.

1) $t_0$, $t_1$, $t_2$, $t_3$: location of tendon routing points relative to link coordinate systems (mm). The palm coordinate system (used for t0) is located at the proximal joint 1008; the proximal link's 1012 coordinate system (used for t1 and t2) is located at the distal joint 1010, and the distal link's 1014 coordinate system (used for t3) is located at the fingertip. In each case, x is parallel with the bottom of the corresponding link 1012, 1014, 1034 and pointing away from the palm 1034, and z is the joint's 1008, 1010 axis of rotation, with positive rotation around z corresponding to flexion.

Figure 10:
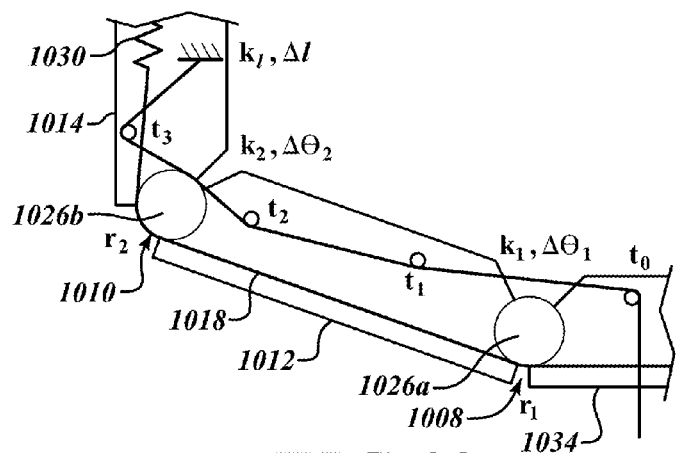
FIG. 10 is a schematic view of a portion of one finger and palm of a mechanical hand, gripper or end effector having a pair of opposed fingers each with a proximate and a distal link, showing an actuatable flexor tendon physically coupling a palm link, proximate link, and distal link via a set of routing points, and a passive tendon physically coupling the palm link with the distal link via a pair of mandrels at a pair of joints between the links, illustrating various parameters to be optimized per Table II, according to at least one illustrated embodiment.

2) k1, 2, $\Delta\theta_1$, 2: stiffness (Nmm/rad) and pre tensioning (rad) of joint torsional springs (not shown in FIG. 10).

3) k1 and $\Delta_1$: stiffness (N/mm) and pre-tensioning (mm) of linear spring 1030 attached to extensor tendon 1018.

4) r1, r2: radii (mm) of joint mandrels 1026a, 1026b for proximal 1008 and distal joint 1010.

The best configuration found is presented in Table II.

TABLE II

Parameter Values for Optimized Gripper.

| param. | | | | | | | |
| --- | --- | --- | --- | --- | --- | --- | --- |
| $t_{0x}$ | $t_{0y}$ | $t_{1x}$ | $t_{1y}$ | $t_{2x}$ | $t_{2y}$ | $t_{3x}$ | $t_{3y}$ |
| −25.0 | 6.0 | −45.0 | 3.6 | −7.6 | 0.9 | −42.0 | −5.0 |

| param. | | | | | | | |
| --- | --- | --- | --- | --- | --- | --- | --- |
| $k_1$ | $\Delta\theta_1$ | $k_2$ | $\Delta\theta_2$ | $k_1$ | $\Delta\theta_1$ | $r_1$ | $r_2$ |
| 9.9 | 4.5 | 4.5 | 4.3 | 0.24 | 12.0 | 2.4 | 3.2 |

The value of the dimensionless optimization function S, computed using Alg. 1, above, for this configuration is 3.47. This value represented the norm of the error metrics computed over a set of 18 poses (11 fingertip grasps and 7 enveloping grasps), according to multiple constraints for each pose. As such, it is difficult to attach intuitive insights to any particular value. It is however noted that each individual error metric was defined so that a value below 1.0 indicates qualitatively acceptable behavior; as such, we take a norm of 3.47 over 64 total constraints to be acceptable, a result that was indeed confirmed in practice, as shown below.

Figure 11:
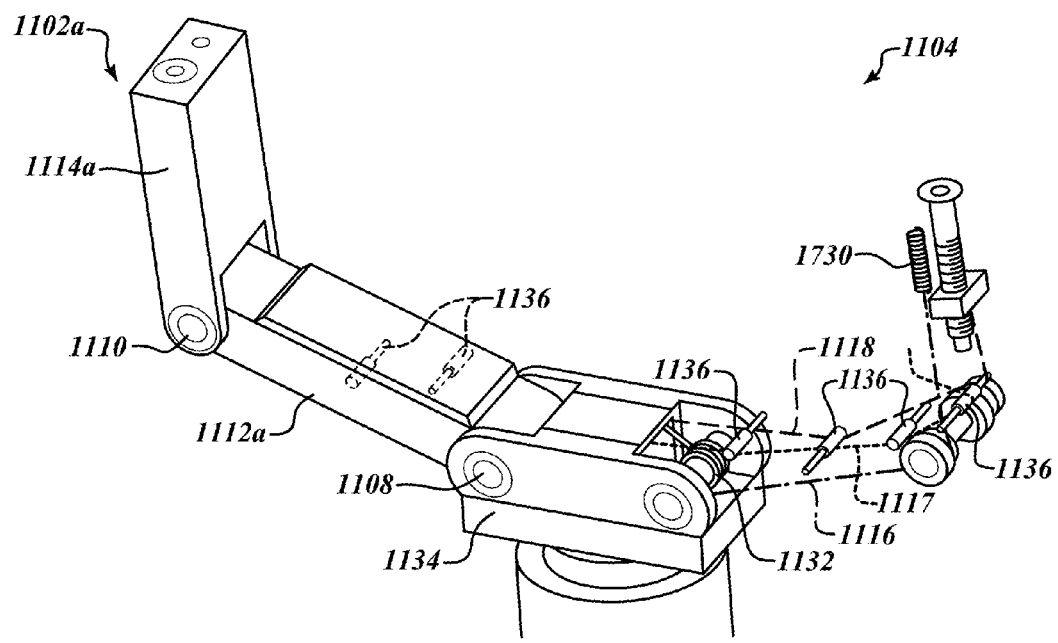
FIG. 11 is a schematic view of a model of a mechanical hand, gripper or end effector having a pair of opposed fingers (only one shown), each with a proximate and a distal link, and showing an actuatable flexor tendon, extensor tendon, and passive tendon physically coupling a palm link, proximate link, and distal link, according to at least one illustrated embodiment.
Figure 12A:
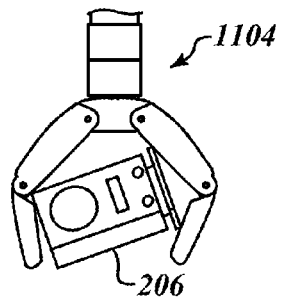
FIGS. 12A-12L are various views of a mechanical hand, gripper or end effector having a pair of opposed fingers grasping a variety of objects in a variety of orientations via fingertip and enveloping grasps, according to at least one illustrated embodiment.
Figure 12B:
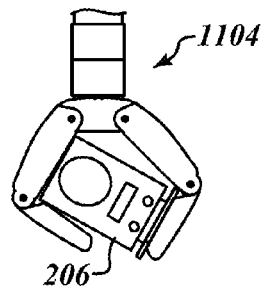
Figure 12C:
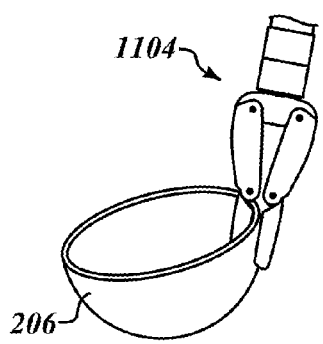
Figure 12D:
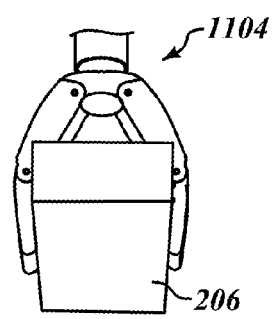
Figure 12E:
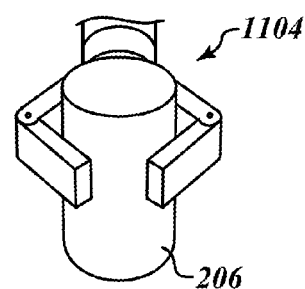
Figure 12F:
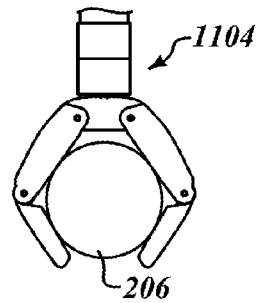
Figure 12G:
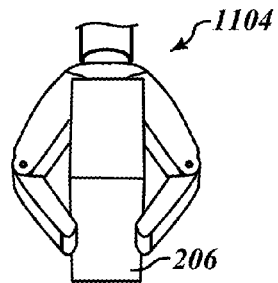
Figure 12H:
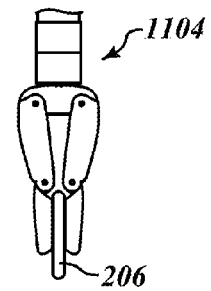
Figure 12I:
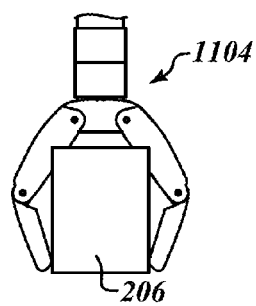
Figure 12J:
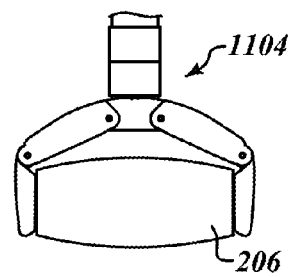
Figure 12K:
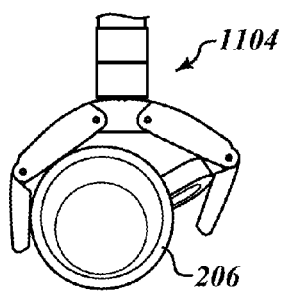
Figure 12L:
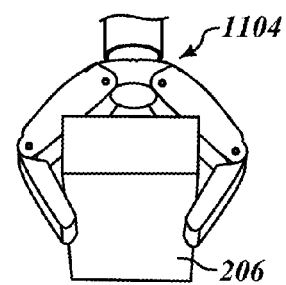

Based on these results, the model shown in FIG. 11 was designed, and then used to construct a prototype gripper 1104. The links 1112a, 1114a, 1134 were 3D-printed on a ProJet HD 3000 rapid prototyping machine. The prototype gripper 1104 used off-the-shelf torsional 1132 and linear springs 1130, as well as ball bearings for the joints 1108, 1110. The tendons 1116, 1117, 1118 were made from Spectra lines, commonly used for fishing or kiting, a model rated to 200 lbs. force. A number of the routing points 1136 are called out in FIG. 11, as are the flexor tendon 1116, passive tendon, and extensor tendon 1118. The fingers 1102a (only one shown) were padded with off-the-shelf rubber pads. The total cost of parts for the gripper 1104 (excluding the motor) was approximately $70.

The prototype gripper 1104 exhibited all the desired characteristics. In particular, the prototype gripper 1104 was used to demonstrate both fingertip grasps, on objects ranging in size from the maximum finger span to a sheet of paper, and enveloping grasps, on objects with dimensions as predicted by our dimensional optimization. In addition, the prototype gripper 1104 was suitable for grasping objects of irregular shapes, and using off-center approach directions. A number of examples of the gripper 1104 grasping objects 1206 are shown in FIGS. 12A-12L. The closing sequence for both a fingertip and enveloping grasp can be seen in FIGS. 1A-1F.

VI. Discussion and Conclusions

This disclosure introduces two types of optimization and analysis for a two-finger, single-actuator gripper. A first goal was for the gripper to achieve stable fingertip grasps, with the distal links in perfect opposition, as long as the fingers close unobstructed. In case the proximal links are stopped by contact with the object, the distal links must flex, creating stable enveloping grasps. A second goal was to extend the range of objects that the gripper can kinematically enclose. As shown herein, these goals can be achieved by a combination of optimized links dimensions and actuation parameters.

A prototype gripper 1104 has been constructed according the results of these optimizations, and the approached described herein validated. The resulting end-effector can perform fingertip and enveloping grasps for a wide range of objects, exhibits the desired transition between these modes, and passively adapts to the shape of the object while maintaining stable grasps.

While noting the capabilities of a gripper designed using this approach, it is important to also highlight its limitations. This end-effector is meant to explore what is possible with a relatively low-complexity design, and very affordable hardware (and, in particular, a single actuator). An understanding of the trade-offs involved can help put the design to the best use, by matching it with suitable applications, and inform the design of more complex versions, for cases where improved performance is necessary.

A single actuated tendon provides flexion forces for both proximal and distal joints, meaning that a combination of flexion at the proximal joint and extension at the distal joint leads to no net change in tendon length. As such, external forces acting on the grasped object that induce this combination of joint motions are not resisted by the motor, but only by friction between the object and the rubber fingerpads. Transition from fingertip to enveloping grasps happens passively, with no active sensing or grasp planning, but does require a level of friction between the grasped object and the robot's proximal links, reducing the range of objects that can be enclosed. The two fingers are in permanent opposition, enabling fingertip grasps of very small objects but leading to collision between the distal links when trying to envelop them.

Figure 13A:
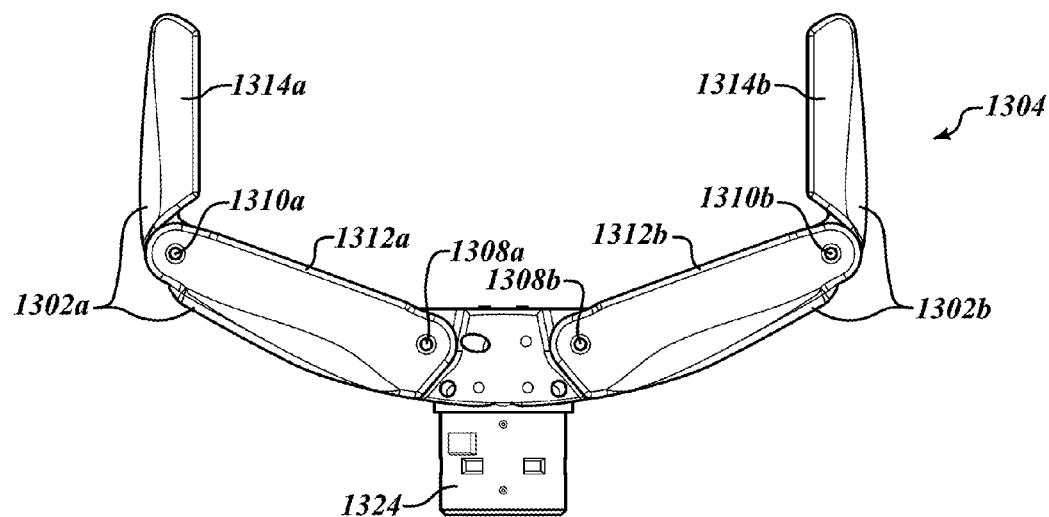
FIG. 13A is a top plan view of a kinematic assembly including a palm and a pair of opposed finger, each with a proximate and a distal link, according to at least one illustrated embodiment.

Referring to FIGS. 13A-13E, a gripper system may comprise a kinematic assembly 1304 that is removably coupleable to an adaptation module or "motor pack" 1350. Referring to FIG. 13A, in one embodiment a kinematic assembly 1304 may comprise two finger assemblies 1302a, 1302b, each comprising a distal finger element 1314a, 1314b movably coupled to a proximal finger element 1312a, 1312b with a distal joint 1310a, 1310b. The proximal finger elements 1312a, 1312b are movably coupled, via proximal joints 1308a, 1308b to a proximal assembly 1324.

The proximal assembly 1324 may be removably coupled to the motor pack 1350 (FIGS. 13C-E) in a manner such that the proximal assembly 1324 may receive a motion actuation transferring element, such as a motion actuation piston fitting 1352 (FIG. 13C), to cause the kinematic assembly 1304 to move in accordance with movement of a motor 1354 in the motor pack 1350.

Figure 13B:
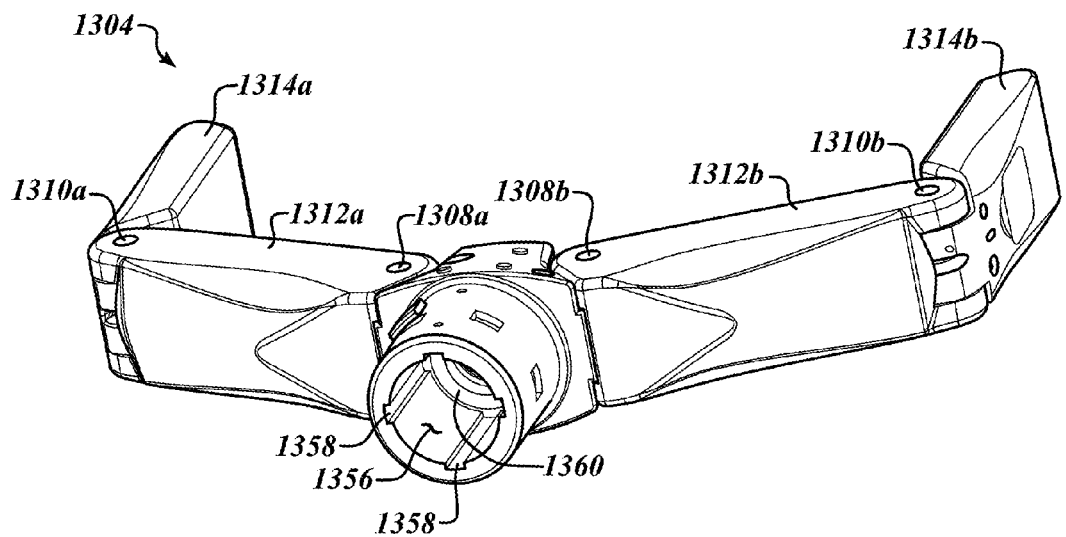
FIG. 13B is a bottom isometric view of the kinematic assembly of FIG. 13A, showing a recess, channeled or grooved coupling features, and a circumferential coupling recess, which allow detachable coupling of the kinematic assembly to a motor pack, according to at least one illustrated embodiment.

Referring to FIG. 13B, the proximal end of one embodiment of a proximal assembly 1324 is shown in orthogonal view to illustrate that a recess 1356 may be defined therethrough to accommodate coupling with the motor pack 1350. The recess may comprise one or more channeled or grooved coupling features 1358, along with a circumferential coupling recess 1360. The channeled or grooved coupling features 1358 and circumferential coupling recess 1360 allow an actuation piston fitting 1352, such as that depicted in FIG. 13C, to be removably coupled into such recesses 1360 and/or grooves 1358, and to pass a tension motion actuation to the flexor tendons of the kinematic assembly 1304, as described above. In other words, the kinematic assembly 1304 is removably coupleable from the motor pack 1350 by virtue of such a coupling configuration, wherein one or more motion actuations may be passed across the interface which also serves to couple the two assemblies to each other.

Figure 13C:
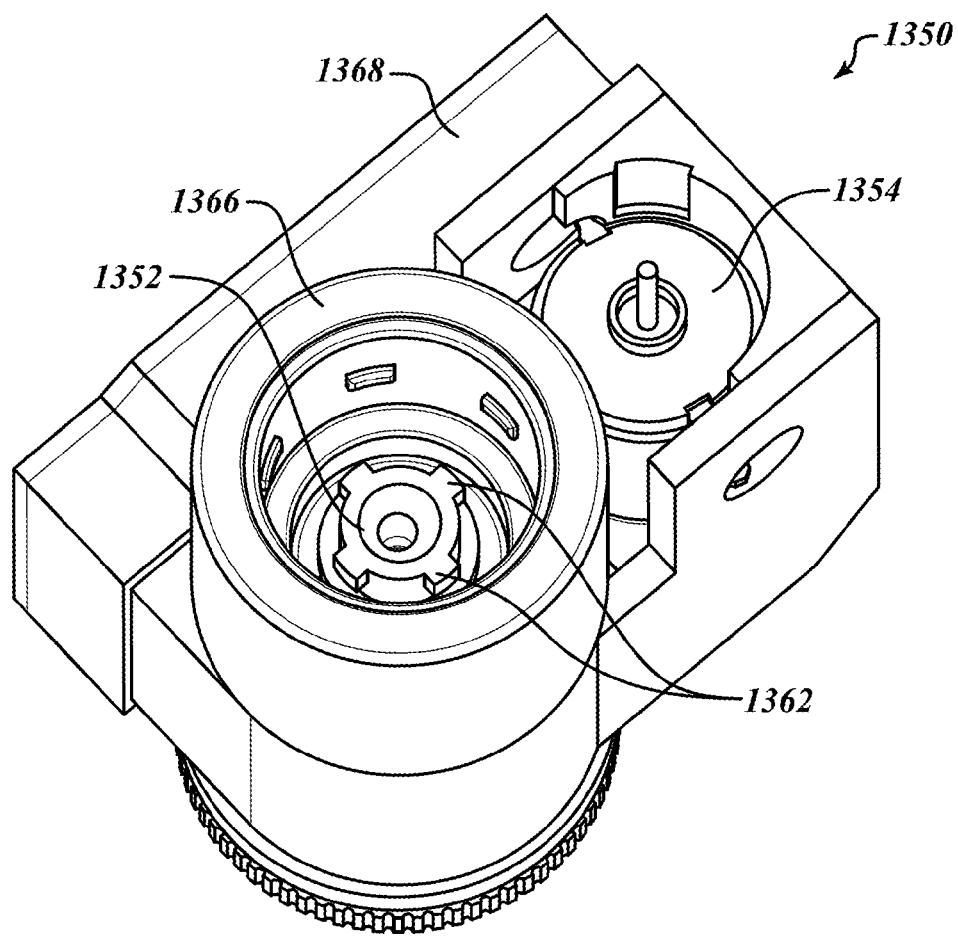
FIG. 13C is a top isometric view of a drive pack including an electric motor, motor controller board, gear train or transmission, and screw member, for driving the kinematic assembly of FIG. 13A when coupled thereto, according to at least one illustrated embodiment.

Referring to FIG. 13C, the depicted embodiment, the removable coupling is accomplished by inserting the coupling features 1362 of the actuation piston fitting 1352 through the channels 1356 of the proximal assembly 1324 until they reach the circumferential coupling recess 1360. The kinematic assembly 1304 is then twisted relative to the motor pack 1350 to place the coupling features 1362 within the circumferential coupling recess 1360. Such provides a stable coupling for applying tensile loads across the interface between the kinematic assembly 1304 and the motor pack 1350, to ultimately controllably tension the tendons within the kinematic assembly 1304 and cause grasping of the kinematic assembly 1304 as per the above description. An engagement ring 1366 provides counterloading to tensile loads passed through the actuation piston fitting 1352 as the engagement ring 1366 is interfaced with the proximal assembly 1324 of the kinematic assembly 1304.

Also shown in FIG. 13C are an electric motor 1354 and a motor controller board 1368. The electric motor 1354 and the motor controller board 1368 are configured to controllably cause the actuation piston fitting 1352 to insert (extend) or retract.

Figure 13D:
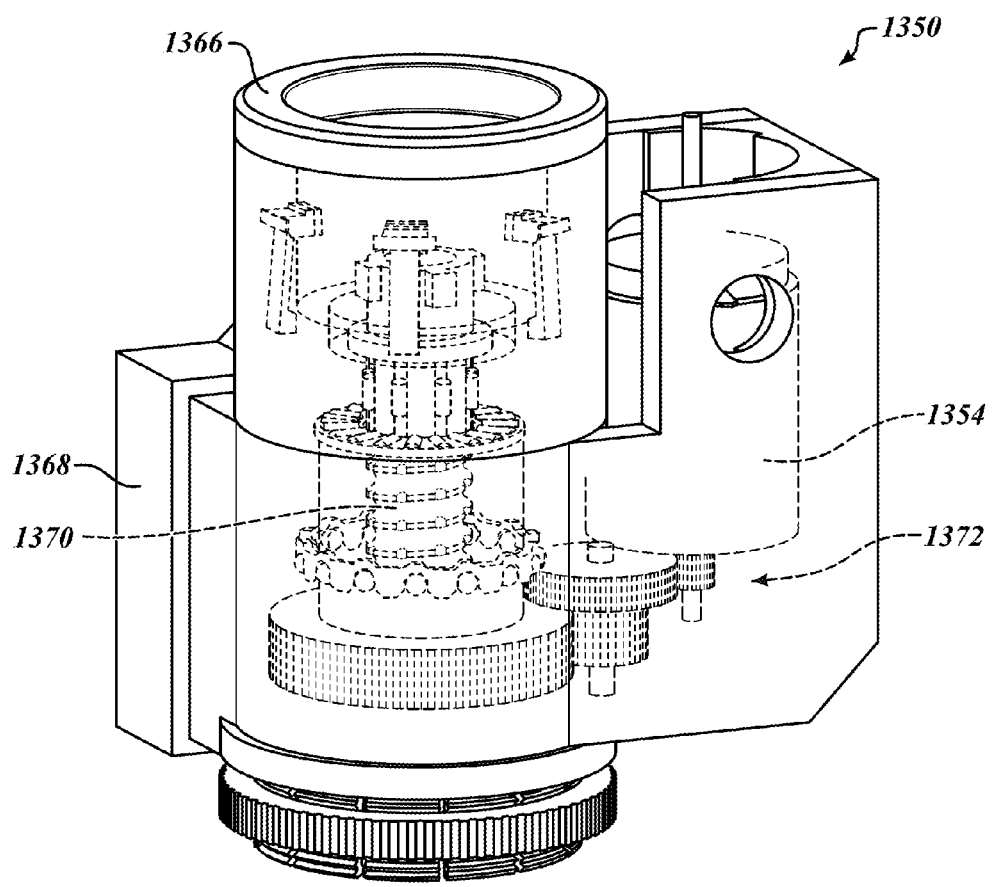
FIG. 13D is a side isometric view of the drive pack of FIG. 13C.

Referring to FIG. 13D, a side orthogonal view of a motor pack 1350 is shown featuring a transparent outer housing to facilitate a limited view of a threaded member or screw member 1370 that is coupled to an output shaft of the motor 1354 by a gear train or transmission assembly 1372 such that rotation of the electric motor 1354 causes rotation of the screw member 1370. Rotation of the screw member 1370 causes the actuation piston fitting 1352 to insert (extend) or retract relative to the engagement ring 1366, causing insertion or retraction of one or more tensile element or tendons of a kinematic assembly 1304 when a kinematic assembly 1304 is removably coupled to the motor pack 1350. A proximal coupling interface 1374 is configured to be removably coupled to a structural member such as a robotic wrist or other portion of a robotic arm.

Figure 13E:
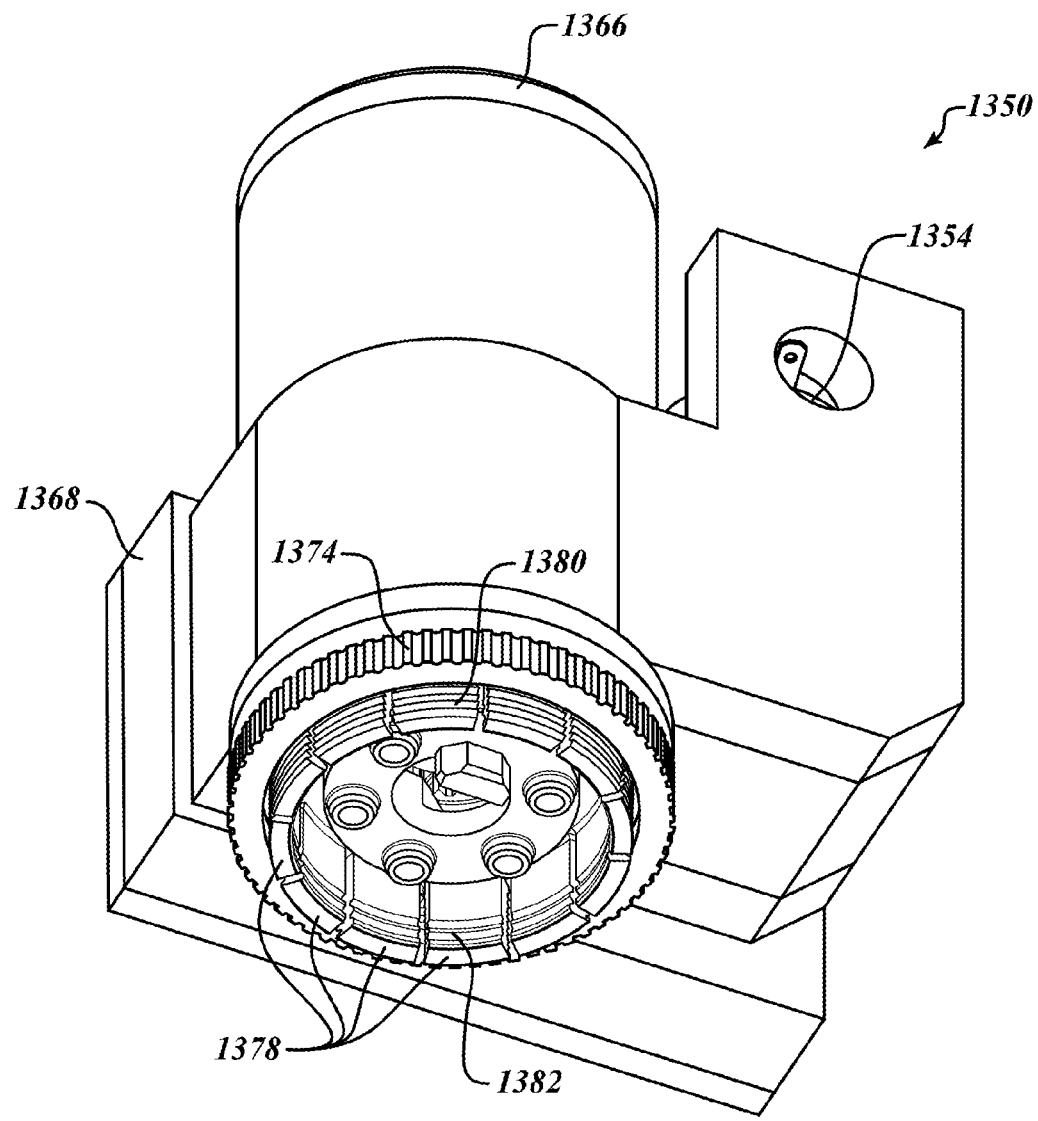
FIG. 13E is a bottom isometric view of the drive pack of FIG. 13C, showing coupling structure to detachably couple the kinematic assembly to the drive pack without electrical couplings or contacts, according to at least one illustrated embodiment.

FIG. 13E illustrates a bottom orthogonal view of a motor pack 1350 with aspects of a proximal coupling interface 1374 depicted. In the depicted embodiment, a series of perimetric coupling elements 1378 forming an outer threaded surface 1380 as well as an inner threaded surface 1382 may be movably engaged by a coupling ring intended to be loosened or tightened relative to the outer threads 1380 manually (i.e., using an operator's hand. The coupling ring may be configured to create a radially-constraining "hoop stress" that maintains, and also allows adjustability of, an overall diameter of the assembly of perimetric coupling elements 1378 so that the inner threaded surface 1382 may be screwed onto a fitting on a substrate member (i.e., such as a robotic arm) with a desired diameter of the assembly of perimetric coupling elements 1378. To lock down the motor pack 1350 relative to the substrate member, the coupling member may be further rotated to cause a clamping level of hoop stress against the interfaced substrate member, for secure coupling of the motor pack 1350 to the substrate member. The assembly of perimetric coupling elements 1378 may comprise a material such as a metal or polymer. The assembly of perimetric coupling elements 1378 may be configured such that it is intended to be a mechanical failure and decoupling point for the kinematic assembly-motor pack-substrate member assembly in the event that a substantial collision is encountered at the kinematic assembly 1304. In other words, should a collision with a foreign object cause a load to the gripper/motor pack/substrate system that exceeds a certain design threshold, the system may be configured such that the proximal coupling interface 1374 breaks loose from the substrate by small micromotions at one or more of the assembly of perimetric coupling elements 1378 which allow for a release of the substrate from the assembly of perimetric coupling elements 1378.

The removable interface described above in relation to FIGS. 13A-13E facilitates design of a kinematic assembly 1304 which has no motors or electronics. This allows the kinematic assemblies 1304 to be easily removed, cleaned or sterilized without motor or electronic damage. This allows kinematic assembly 1304 to be easily replaced—or traded in a "tool change" type of configuration for another tool, such as another size of kinematic assembly, another tool, such as a pipetting device or syringe, or another kinematic assembly 1304. Other kinematic assemblies 1304 may, for example, have 1, or 3, or more fingers as opposed to two as in the depicted embodiment. Such configurations may feature motor packs with two more motors, as well as removable couplings that facilitate passage of two or more insertion/retraction motion actuations, for example.

In one embodiment, a robot or robotic arm may carry or have available a tool compartment or "holster" into which a kinematic assembly 1304 may be inserted, such as in a closed grasp configuration for geometric efficiency, after which the robot may rotate the substrate member (or rotate and/or insert/retract, depending upon the particular release configuration. The configuration depicted in FIGS. 13A-13E requires insertion and turning for coupling, and turning and retraction for decoupling), thereby rotating the motor pack 1350 and decoupling the motor pack 1350 from the kinematic assembly 1304. Importantly, the coupling and decoupling action described herein is a tool-less exchange (i.e., does not require tools such as wrenches and the like—only requires specific combined motions, such as insertion/rotation along certain axes). Also importantly, since the aforementioned kinematic assembly 1303 embodiment has no motors or electronics, not only may it be cleaned or cheaply replaced, but also it may be decoupled in an uncomplicated manner—without electronic leads or contacts to disconnect.

Figure 14A:
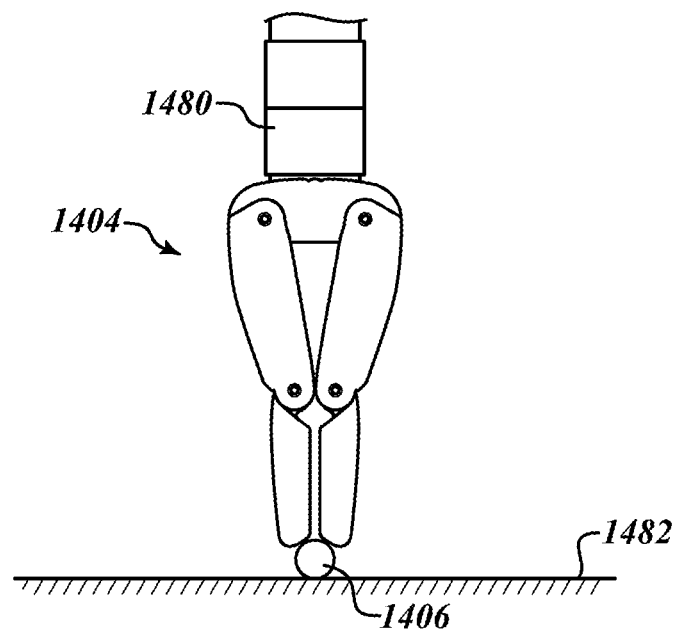
FIG. 14A is a schematic view of a conventional mechanical hand, gripper or end effector having a pair of opposed fingers and located at an end of a robotic arm attempting to grasp an object from a flat surface where the robotic arm has positioned the finger a bit too high, causing the fingers to miss the object to be grasped.
Figure 14B:
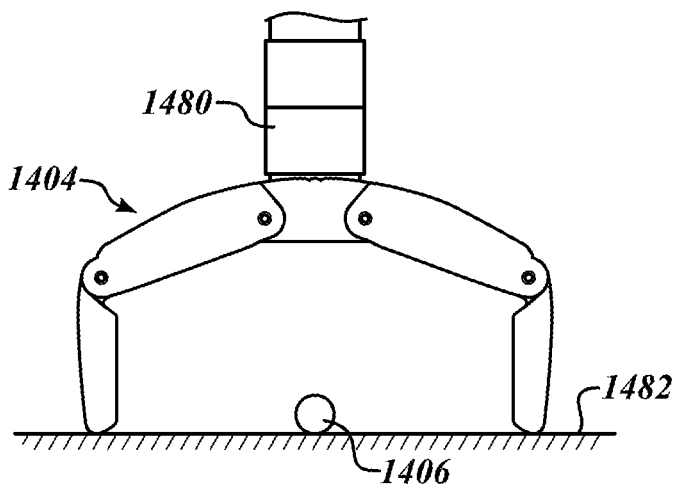
FIG. 14B is a schematic view of the conventional mechanical hand, gripper or end effector of FIG. 14A where the robotic arm has positioned the finger a bit too low, causing the fingers to collide with the surface.

Referring to FIGS. 14A-14B, one of the challenges with a conventional coupling of a gripper or kinematic assembly 1404 to a robotic arm 1480 is in picking up a small object 1406, such as a pen, from a substantially flat surface 1482, such as a tabletop. As shown in FIG. 14A, if the robotic arm 1480 places the gripper 1404 a bit too high relative to the object (e.g., pen) 1406, the gripper 1402 misses the object 1406 to be grasped. As shown in FIG. 14B, if the robotic arm 1480 places the gripper 1406 a bit too low relative to the object (e.g., pen) 1046, the gripper 1402 collides with the flat surface (e.g., tabletop) 1482, and conventionally is unable to pick up the object (e.g., pen) 1406 from there without further adjustment.

Referring to FIGS. 15A-15H, with the subject underactuated gripper design configurations, a kinematic assembly 1504 may be advanced by a robotic arm 1580 toward a small object 1506, such as a pen, from a substantially flat surface 1582, such as a tabletop, with an elevation relative to the object 1506 that typically would be too close, and still successfully grasp and pick up the object (e.g., pen) 1506.

Figure 15A:
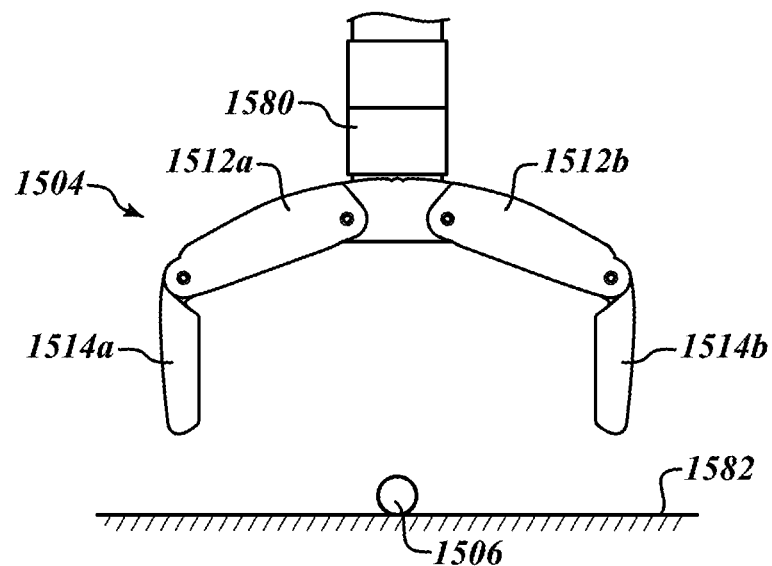
FIG. 15A is a schematic view of an underactuated mechanical hand, gripper or end effector according to the teachings herein, where a pair of opposed fingers of a kinematic assembly located at an end of a robotic arm approach an object to be grasped which sits on a flat surface from a position that would be too close for a conventional mechanical hand, gripper or end effector.

Referring to FIG. 15A, a kinematic assembly 1504 is being advanced toward an object (e.g., pen) 1506 in a configuration that conventionally would be too close for fingertip grasping.

Figure 15B:
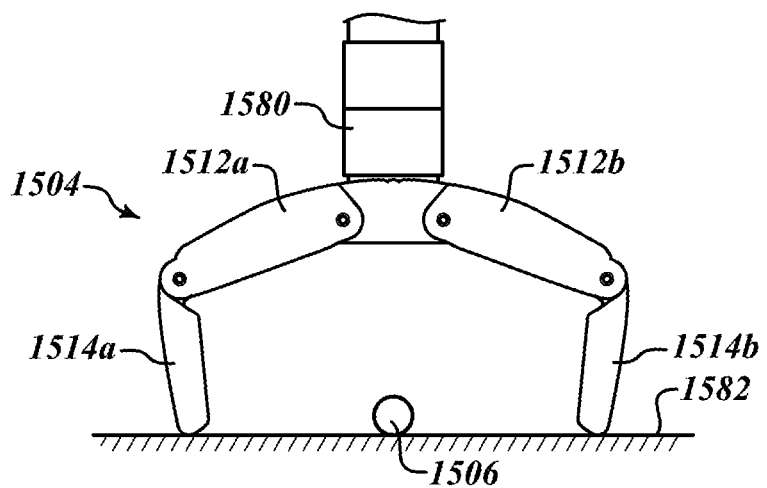
FIGS. 15B-15D are schematic views of the underactuated mechanical hand, gripper or end effector of FIG. 15A at successive times, where in response to collision of fingertips of the opposed fingers with the flat surface, the kinematic assembly adapts by passively rotating the distal finger elements to grasp the object.

As shown in FIG. 15B, the fingertips 1584a, 1584b of the kinematic assembly 1504 collide with the tabletop 1582. However, rather than become mechanically overconstrained, the passive adaptation of the kinematic assembly 1504 to the environment, which is based upon tendon routing/geometry and general kinematics described herein, allows the kinematic assembly 1504 to adapt and rotate the distal finger elements 1514a, 1514b inward toward the object (e.g., pen) 1506 to be grasped.

Figure 15C:
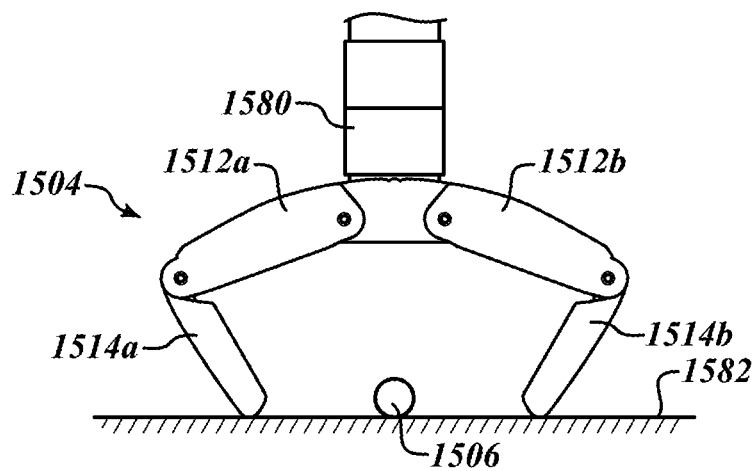
Figure 15D:
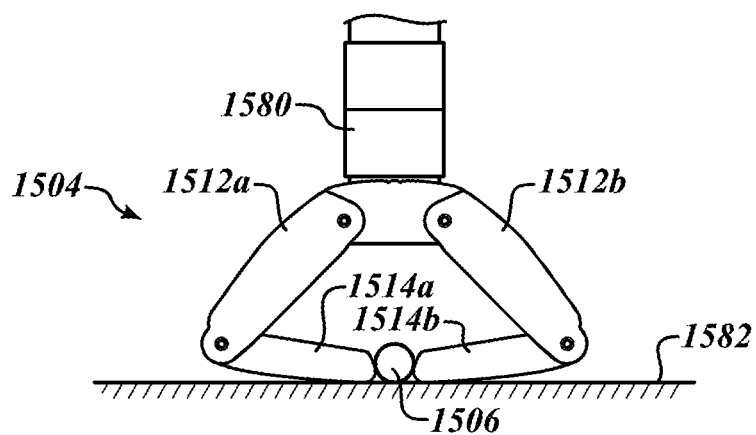

FIG. 15B shows these distal finger elements 1514a, 1514b starting to rotate inward toward the object (e.g., pen) 1506. FIGS. 15C and 15D each show further inward rotation of the distal finger elements 1514a, 1514b until the object (e.g., pen) 1506 is grasped between the distal ends of the fingertips 1584a, 1584b.

Figure 15E:
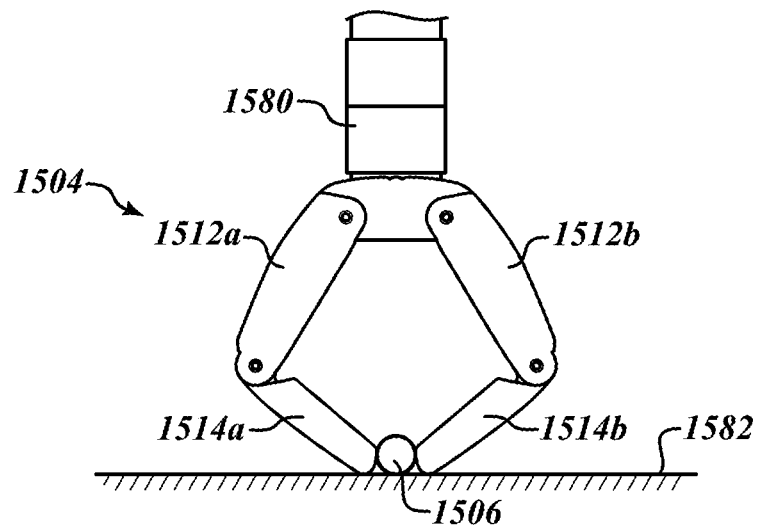
FIG. 15E is a schematic view of the underactuated mechanical hand, gripper or end effector of FIG. 15A, where in response to an upward motion of the kinematic assembly away from the surface, the distal finger elements passively rotate downward while the proximal finger elements passively rotate inward toward the object, according to at least one illustrated embodiment.
Figure 15F:
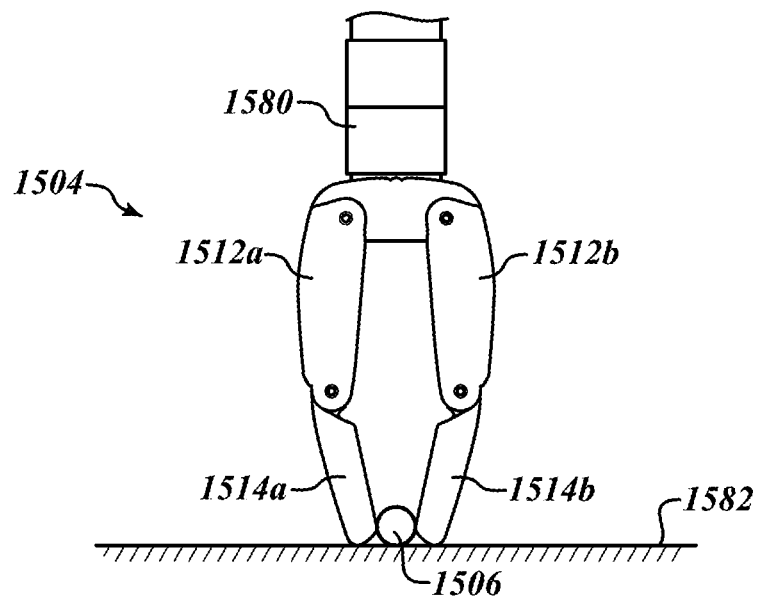
FIGS. 15F-15H are schematic views of the underactuated mechanical hand, gripper or end effector of FIG. 15E at successive times, where the kinematic assembly adapts by passively rotating the distal finger elements to grasp the object.
Figure 15G:
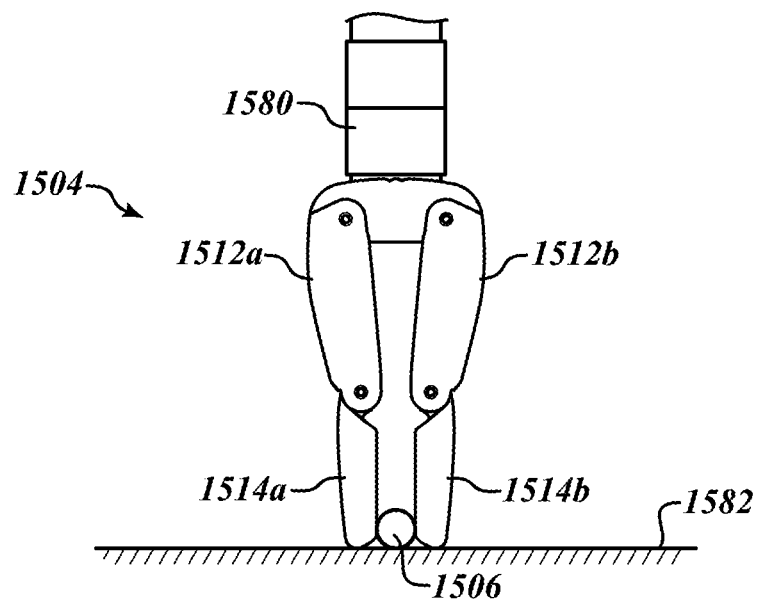
Figure 15H:
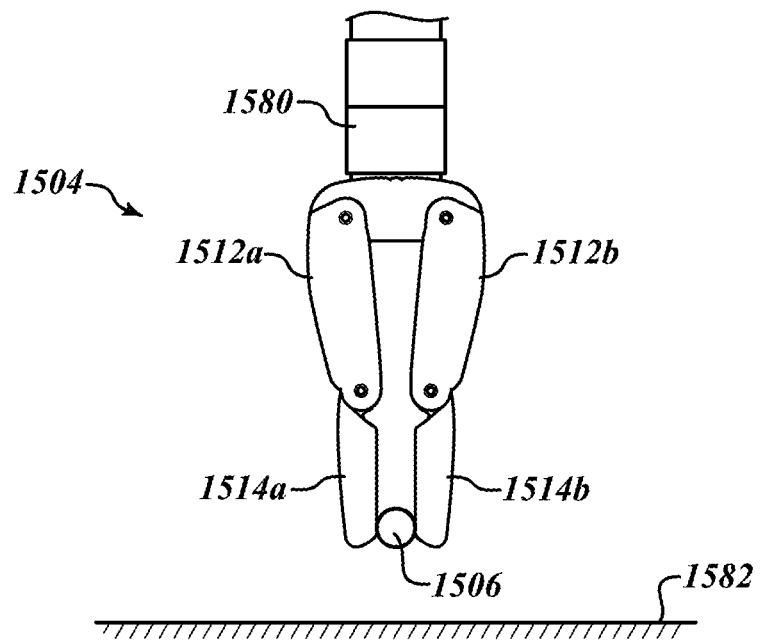
Figure 16A:
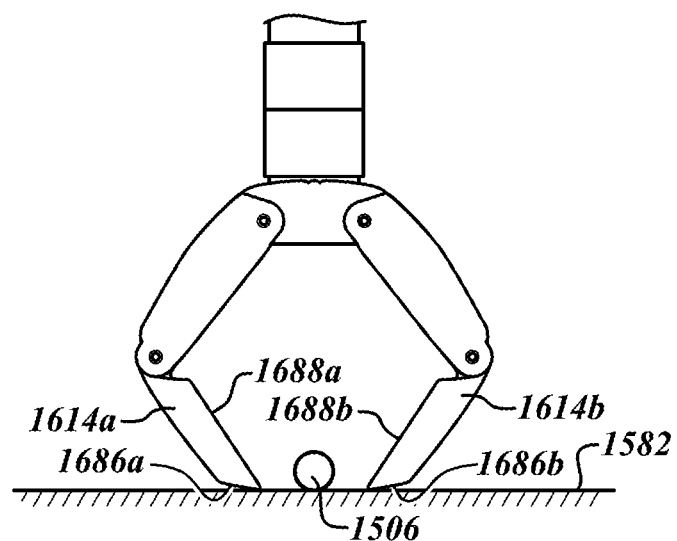
FIGS. 16A-16D are schematic views of a pair of wedged distal finger elements of opposed fingers approaching and grasping an object from a flat surface at successive times, where the wedged distal finger elements have a wedged geometry on an respective outer/distal aspects and a flat geometry on a respective gripping surface, according to at least one illustrated embodiment.
Figure 16B:
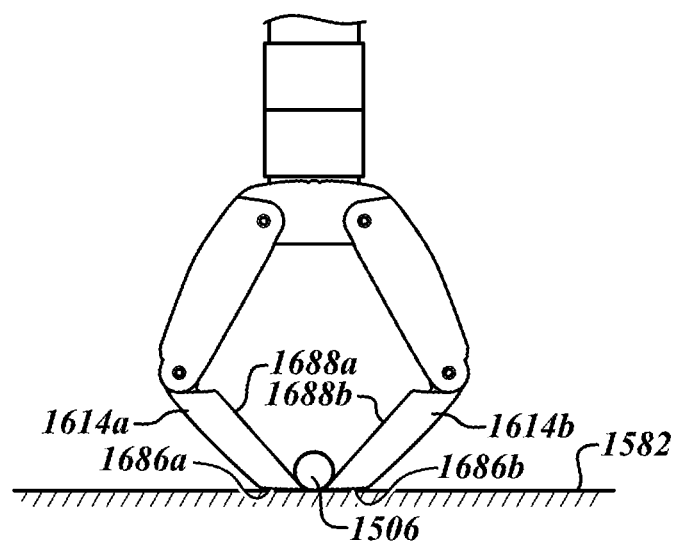
Figure 16C:
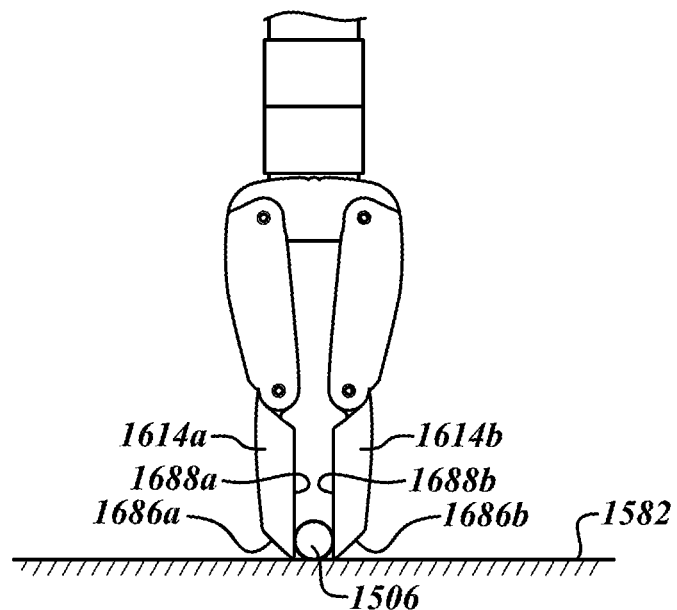
Figure 16D:
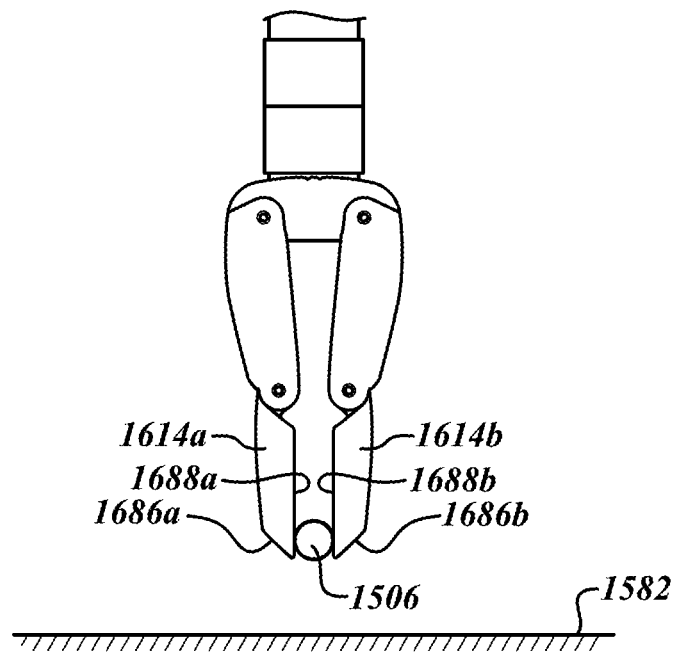

In one embodiment, the kinematic assembly may be configured to allow for the robot or operator to command a pick up of the object 1506 straight away from this grasping configuration. In another embodiment, with an upward motion of the kinematic assembly 1504 away from the surface (e.g., tabletop) 1582, the distal finger elements 1514a, 1514b are allowed to rotate downward while the proximal finger elements 1512a, 1512b rotate inward toward the object (e.g., pen) to be grasped, as shown in FIG. 15E. With further upward motion of the kinematic assembly 1504 away from the surface (e.g., tabletop) 1582, as shown in FIGS. 15F and 15G, the object (e.g., pen) 1506 becomes grasped in a conventional fingertip grasp, after which the object 1506 may securely be lifted away from the surface 1582, as shown in FIG. 15H.

FIGS. 16A-16D show wedged distal finger elements 1614a, 1614b, having a wedged geometry on their outer/distal aspects 1686a, 1686b, but having a flat geometry on their gripping surfaces 1688a, 1688b. Such may be used as in the distal finger elements 1514a, 1514b described above. This may assist in grasping scenarios such as the configuration described above in reference to FIGS. 15A-15H. As shown in FIGS. 16A-16D, the wedged/recessed outer geometry 1686a, 1686b allows for relatively easy scooping of the object (e.g., pen) 1506, rotation of the kinematic assembly members relative to each other, and lifting away from the surface (e.g., tabletop) 1582.

Future designs can improve performance in multiple ways. For example, distal links on opposite fingers that overlap with each other instead of colliding when performing enveloping grasps can enable the enclosing of smaller objects. Also for example, inclusion of an additional link for each finger, as in the MARS [1] or SARAH [2] hands, could improve the ability to adapt to various grasped object shapes. As a further example, independent actuation for the proximal and distal joints can increase the stability of grasps; combined with tactile sensing, this approach can enable enveloping grasps of a wider range of objects. The features will play an important role on the way to versatile end-effectors, widely available for operation in unstructured environments.

[1] C. Gosselin, T. Laliberte, and T. Degoulange, "Underactuated robotic hand," in Video Proc. of the IEEE Intl. Conf. on Robotics and Automation, 1998.

[2] T. Laliberte, L. Birglen, and C. M. Gosselin, "Underactuation in robotic grasping hands," Machine Intelligence & Robotic Control, vol. 4, no. 3, pp. 1-11, 2002.

[3] A. Dollar and R. Howe, "Joint coupling design of underactuated grippers," in Mechanisms and Robotics Conf., 2006.

[4] A. Dollar and R. Howe, "Simple, robust autonomous grasping in unstructured environments," in IEEE Intl. Conf. on Robotics and Automation, 2007, pp. 4693-4700.

[5] N. Ulrich, R. Paul, and R. Bajcsy, "A medium-complexity compliant end effector," in IEEE Intl. Conf. on Robotics and Automation, 1988.

[6] L. Birglen, T. Laliberte, and C. Gosselin, Underactuated Robotic Hands. Springer Tracts in Advanced Robotics, 2008.

[7] R. Kurtz and V. Hayward, "Dexterity measure for tendon actuated parallel mechanisms," in IEEE Intl. Conf. on Advanced Robotics, 1991.

[8] A. Bicchi and D. Prattichizzo, "Analysis and optimization of tendinous actuation for biomorphically designed robotic systems," Robotica, vol. 18, pp. 23-31, 2000.

[9] N. Pollard and R. Gilbert, "Tendon arrangement and muscle force requirements for humanlike force capabilities in a robotic finger," IEEE Intl. Conf. on Robotics and Automation, pp. 3755-3762, 2002.

[10] J. Fu and N. Pollard, "On the importance of asymmetries in grasp quality metrics for tendon driven hands," in IEEE-RAS Intl. Conf. on Intelligent Robots and Systems, 2006.

[11] C. Gosselin, F. Pelletier, and T. Laliberte, "An anthropomorphic underactuated robotic hand with 15 Dofs and a single actuator," IEEE Intl. Conf. on Robotics and Automation, 2008.

[12] C. Brown and H. Asada, "Inter-finger coordination and postural synergies in robot hands via mechanical implementation of principal components analysis," in IEEE-RAS Intl. Conf. on Intelligent Robots and Systems, 2007.

[13] M. C. Carrozza, G. Cappiello, S. Micera, B. B. Edin, L. Beccai, and C. Cipriani, "Design of a cybernetic hand for perception and action," Biol. Cybern., vol. 95, no. 6, pp. 629-644, 2006.

[14] M. Mason and K. Salisbury, Robot hands and the mechanics of manipulation. MIT Press, 1985.

[15] M. Buss, H. Hashimoto, and J. Moore, "Dextrous hand grasping force optimization," IEEE Trans. on Robotics and Automation, vol. 12, pp. 406-418, 1996.

[16] L.-W. Tsai, Robot Analysis. John Wiley & Sons, 1999.

[17] L. Han, J. Trinkle, and Z. Li, "Grasp analysis as linear matrix inequality problems," IEEE Trans. on Robotics and Automation, vol. 16, pp. 663-674, 2000.

[18] S. Kwak, L. Blankevoort, and G. Ateshian, "A mathematical formulation for 3D quasi-static multibody models of diarthroidal joints," Comp. Meth. in Biomech. and Biomed. Eng., vol. 3, pp. 41-64, 2000.

[19] M. Ciocarlie and P. Allen, "A constrained optimization framework for compliant underactuated grasping," Mech. Sciences, vol. 2, no. 1, 2011.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

U.S. provisional patent application Ser. No. 61/711,729 filed Oct. 9, 2012, and U.S. application Ser. No. 14/050,075, filed Oct. 10, 2013, are incorporated herein by reference in their entirety.

Any of the devices described for carrying out the subject diagnostic or interventional procedures may be provided in packaged combination for use in executing such interventions. These supply "kits" may further include instructions for use and be packaged in containers as commonly employed for such purposes.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

The invention claimed is:

1. A mechanical end effector for robotics, comprising:
   a palm;
   a first proximal finger element, wherein the first proximal finger element is pivotally coupled to the palm at a first proximal joint;

a first distal finger element, wherein the first distal finger element is pivotally coupled to the first proximal finger element at a first distal joint;

a second proximal finger element, wherein the second proximal finger element is pivotally coupled to the palm at a second proximal joint;

a second distal finger element, wherein the second distal finger element is pivotally coupled to the second proximal finger element at a second distal joint;

a first passive tendon coupled to the palm and coupled to the first distal finger element, wherein the first passive tendon prevents hyperextension of the first distal joint;

a second passive tendon coupled to the palm and coupled to the second distal finger element, wherein the second passive tendon prevents hyperextension of the second distal joint;

a first active tendon coupled to the first distal finger element;

a second active tendon coupled to the second distal finger element, wherein application of an actuation force to the first and the second active tendons closes the end effector;

the palm, the first proximal finger element, the first distal finger element, and the first passive tendon form a first four-bar linkage; wherein the palm, the second proximal finger element, the second distal finger element, and the second passive tendon form a second four-bar linkage; and wherein the first passive tendon is constrained to partially wrap around a first proximal mandrel at the first proximal joint and partially around a first distal mandrel at the first distal joint.

2. The end effector of claim 1 wherein an amount of a rotation of the first proximal finger element with respect to the palm is represented by a variable $\alpha$ and an amount of a rotation of the first distal finger element with respect to the first proximal finger element is represented by a variable $\beta$, and the first passive tendon prevents a condition where $\alpha+\beta<90°$ throughout a range of motion of the end effector.

3. The end effector of claim 2 wherein the first passive tendon allows a condition where $\alpha+\beta>90°$.

4. The end effector of claim 1 wherein a radius of the first proximal mandrel is equal to a radius of the first distal mandrel.

5. The end effector of claim 1 wherein the first passive tendon terminates at a screw housed in the first distal finger portion, and a length of the passive tendon is finely adjustable in response to a rotation of the screw.

6. The end effector of claim 1 wherein an amount of a rotation of the first proximal finger element with respect to the palm is represented by a variable $\alpha$ and an amount of a rotation of the first distal finger element with respect to the first proximal finger element is represented by a variable $\beta$, and the first passive tendon and a first extensor element constrain the end effector to maintain a condition where $\alpha+\beta=90°$ as the end effector closes unobstructed.

7. The end effector of claim 6 wherein in response to the first and the second proximal joints being stopped due to contact with an object, the first distal joint flexes such that $\alpha+\beta>90°$.

8. A robotic system, comprising:
a palm;
a first finger comprising a first proximal finger element pivotally coupled to the palm at a first proximal joint and a first distal finger element pivotally coupled to the first proximal finger element at a first distal joint;

a second finger comprising a second proximal finger element pivotally coupled to the palm at a second proximal joint and a second distal finger element pivotally coupled to the second proximal finger element at a second distal joint;

a first extensor element physically coupled to bias the first finger into a spaced apart configuration;

a second extensor element physically coupled to bias the second finger into a spaced apart configuration;

a first flexor element physically coupled to actuate the first finger into a closed configuration in response to an application of an actuation force to the first flexor element; and a second flexor element physically coupled to actuates the second finger into a closed configuration in response to an application of an actuation force to the second flexor element;

wherein the first distal finger element has a first gripping surface, the second distal finger element has a second gripping surface, and the first and the second distal finger elements are constrained such that, in response to application of the actuation forces to the first and the second flexor elements, the first and the second gripping surfaces remain parallel to one another along an entire range of movement when the first and the second proximal finger elements are not in contact with an object to be grasped, and the first and the second distal finger elements passively rotate toward one another when at least one of the first or the second proximal finger element is in contact with the object to be grasped.

9. The system of claim 8 wherein the first extensor element comprises a first extensor tendon and wherein the second extensor element comprises a second extensor tendon.

10. The system of claim 9 wherein the first extensor tendon is coupled to a first linear spring and wherein the second extensor tendon is connected to a second linear spring.

11. The system of claim 9 wherein the first extensor element further comprises a first proximal torsional spring at the first proximal joint and a first distal torsional spring at the first distal joint, and the second extensor element further comprises a second proximal torsional spring at the second proximal joint and a second distal torsional spring at the second distal joint.

12. The system of claim 8 wherein one or more of the torsional springs are pre-tensioned.

13. The system of claim 8, further comprising:
a first passive tendon coupled to the palm and coupled to the first distal finger element to prevent hyperextension of the first distal joint; and
a second passive tendon coupled to the palm and coupled to the second distal finger element to prevent hyperextension of the second distal joint.

14. A method of actuating a robotic gripper, comprising:
applying an actuation force to a first flexor element of a robotic gripper and a second flexor element of the robotic gripper, wherein the gripper includes a first proximal finger element and a second proximal finger element pivotally coupled to a palm and a first distal finger element and a second distal finger element pivotally coupled to the first and the second proximal finger elements, respectively, wherein, upon application of the actuation force to the first and the second flexor elements, the first and the second distal finger elements remain parallel to one another along an entire range of movement when the first and the second proximal finger elements are not in contact with an object to be grasped, and the first and the second distal finger elements passively rotate toward one another when at least one of the first or the second proximal finger element is in contact with the object to be grasped;

wherein applying an actuation force comprises: applying a parallel closing force; applying an enveloping force; and applying a grasping force;

wherein the first and the second distal finger elements remain parallel to one another during application of the parallel closing force; and the first and the second distal joints flex during application of the enveloping force; and wherein the method further comprises applying an opening force to the first and the second flexor elements.

* * * * *